United States Patent
Giesen et al.

(10) Patent No.: US 8,887,365 B2
(45) Date of Patent: Nov. 18, 2014

(54) GLOVE PORT RETROFIT ASSEMBLY AND METHOD OF REPLACING COMPONENTS

(75) Inventors: Isaac M. Giesen, Red Wing, MN (US); Michael E. Cournoyer, Los Alamos, NM (US); David G. Rael, Espanola, MN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1257 days.

(21) Appl. No.: 12/607,457

(22) Filed: Oct. 28, 2009

(65) Prior Publication Data

US 2011/0067217 A1 Mar. 24, 2011

Related U.S. Application Data

(60) Provisional application No. 61/245,475, filed on Sep. 24, 2009.

(51) Int. Cl.
*B23P 6/00* (2006.01)
*B23P 19/04* (2006.01)
*B25J 21/02* (2006.01)
*B01L 1/02* (2006.01)

(52) U.S. Cl.
CPC ... *B25J 21/02* (2013.01); *B01L 1/02* (2013.01)
USPC .............................. 29/402.09; 29/401.1; 312/1

(58) Field of Classification Search
CPC .......... B25J 21/02; B08B 15/026; G21F 7/04; G21F 7/053
USPC .............. 29/401.1, 402.02, 402.09, 450, 451, 29/235, 282; 312/1
See application file for complete search history.

(56) References Cited

U.S. PATENT DOCUMENTS

| 3,475,808 | A | | 11/1969 | Woolsey |
| 4,010,588 | A | * | 3/1977 | Eisert ........................ 52/204.593 |
| 5,090,782 | A | * | 2/1992 | Glachet et al. .................... 312/1 |
| 5,460,439 | A | | 10/1995 | Jennrich et al. |
| 5,662,581 | A | | 9/1997 | Jennrich et al. |
| 6,357,488 | B1 | | 3/2002 | Brossard et al. |

(Continued)

FOREIGN PATENT DOCUMENTS

JP 2000193788 7/2000

OTHER PUBLICATIONS

"Validation of a new transfer port system for syringe plunger stoppers", Gerresheimer PharmaSystems, A3P 19th International Congress, Biarritz, Oct. 17, 2006 (31 pages).

(Continued)

*Primary Examiner* — David Bryant
*Assistant Examiner* — Christopher M Koehler
(74) *Attorney, Agent, or Firm* — Pauly, DeVries Smith & Deffner

(57) ABSTRACT

What is disclosed is a system for retrofitting a sealed enclosure for performing work therein having an outer enclosure assembly configured to be clamped to the outer annular face of a port ring and form a sealed engagement with the outer annular surface of the port ring, a change assembly having an inner ring and an access element wherein the inner ring has a first annular cylinder body that is sized to be slidably received by the port ring and the access element is configured to be sealably and slidably positioned within the first annular cylinder body of the inner ring.

31 Claims, 23 Drawing Sheets

(56) References Cited

U.S. PATENT DOCUMENTS

| | | | |
|---|---|---|---|
| 7,282,176 B2 * | 10/2007 | Glachet et al. | 422/28 |
| 7,325,890 B2 | 2/2008 | Oyama et al. | |
| 7,381,127 B2 | 6/2008 | Price | |
| 7,469,977 B2 | 12/2008 | Hauville | |
| 2004/0149014 A1 | 8/2004 | Castro et al. | |
| 2007/0248354 A1 | 10/2007 | Hetnarski | |
| 2008/0079336 A1 | 4/2008 | Ladet | |
| 2008/0314774 A1 * | 12/2008 | Granadino | 206/216 |

OTHER PUBLICATIONS

Enclosure System Operating Principle, Central Research Laboratories, http://www.centres.com/nuclear/encl/encloper.htm (at least as early as Apr. 14, 2008) (2 pages).

Glove and Accessory Change System, AD System, La Calhene (at least as early as Sep. 24, 2009), (2 pages).

Pharmaceutical Glove System, Central Research Laboratories, http://www.centres.com/pharm/glove/pharmglv.htm (at least as early as Apr. 2, 2008) (2 pages).

Sealed Pass-Through Enclosure System, Central Research Laboratories, http://www.centres.com/nuclear/encl/encl.htm (at least as early as Apr. 3, 2008) (2 pages).

"Push-Through Glove Systems", Central Research Laboratories (at least as early as Feb. 2006) (20 pages).

Rael et al., "Retrofit of an Engineered Gloveport to a Los Alamos National Laboratory's Plutonium Facility Glovebox", Waste Management 2008 Conference, Phoenix, Arizona, Abstract #8026 (Feb. 24-28, 2008) (9 pages).

Turner et al., "Instrumentation System to Implement Leak Test Program", IEEE Instrumentation and Measurement Technology Conference, Ottawa, Canada (May 19-21, 1997) (6 pages).

* cited by examiner

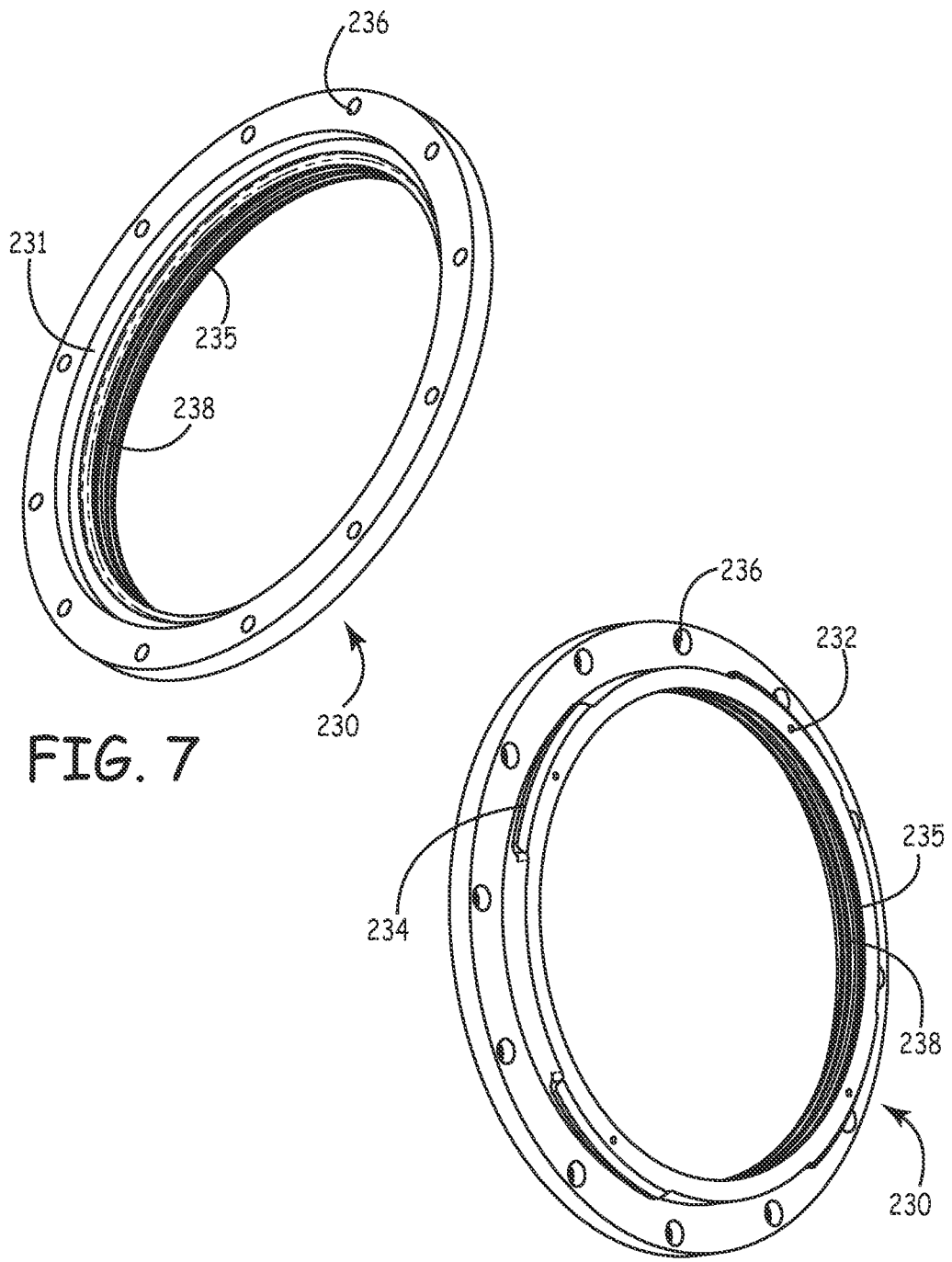

GLOVE PORT RETROFIT ASSEMBLY AND METHOD OF REPLACING COMPONENTS

This application claims the benefit of U.S. Provisional Application No. 61/245,475, filed Sep. 24, 2009, the content of which is herein incorporated by reference in its entirety.

This invention was made with Government support under Contract Number DE-AC51-06NA25396 awarded by the United States Department of Energy. The Government has certain rights in the invention.

FIELD OF THE INVENTION

The field of technology relates to replacement of glove box components such as gloves in an efficient manner without breaking containment.

BACKGROUND

In various industries it is preferable to work, test, assemble, and the like, in an environment that is isolated from normal ambient conditions. For example, it can be preferable for such activities to be contained in a substantially dirtier environment than the ambient conditions, such as hot cells or laboratories, so inside waste does not substantially affect conditions on the outside. In other examples, such as medical and pharmaceutical applications, it may be preferable for activities to occur in a substantially cleaner environment, where outside debris and bacteria cannot substantially affect conditions in the clean environment. A sealed glove system facilitates the performance of work within an enclosure by an operator outside of the enclosure in extending a hand and arm through a glove sealed in a port in a barrier wall of the enclosure.

Gloves for remote handling of substances within a glove box are wear parts. Constant flexing of a glove by the user will naturally cause leakage if not replaced according to a regular maintenance schedule. Also, it is sometimes desirable for other components to be positioned in the glove box port, such as a plug or a bag. In some systems, however, replacement is a time consuming job and can require up to four trained people to replace a glove. The replacement process in these systems also generates a lot of waste, shuts down production, and utilizes costly labor. Replacement in these systems can also be made safer by reducing the occurrence of a glove breach causing contamination of the area outside the glovebox. Other glove box systems are designed for ease of use and include structures that facilitate easy replacement of the glove or sealing of the port. For example, the Sealed Pass-Through Enclosure System is a glove box system available from Central Research Laboratories of Red Wing, Minn. The exchange of gloves, plugs or other components in the opening of the glove box is simple, rapid and integrity of the glove box is maintained during the exchange, due in part to the structure of the glove box port ring. However, it is not possible to use the components of this system with a pre-existing glove box port that does not have the same structures.

What is needed is a gloveport retrofit system that allows for glove servicing of potentially only one person, and a quicker, easier, safer, and less costly replacement process.

SUMMARY OF THE INVENTION

What is described herein is a system for retrofitting a sealed enclosure for performing work therein in order to provide improved exchange of access elements. The sealed enclosure includes an annular port ring having inner and outer annular faces and being fixedly secured in leak-proof sealed relation in a port in the wall of said enclosure. An outer enclosure assembly is clamped to the annular port ring to provide a seal between the outer enclosure assembly and the annular port ring. Additionally, a change assembly is coupled to the outer enclosure assembly and the annular port ring to seal the gloveport side of the wall from the outside of the gloveport. Such a system enables alternating access elements with the use of an ejecting tool.

The outer enclosure assembly extends beyond the outermost end of the port ring and has an inner annular receiving surface that is positioned at the outermost end of the port ring. The change assembly has an inner ring and an access element. The inner ring has a first annular cylinder body having an outer diameter sized to be slidably received by the port ring, where the first annular cylinder body is configured to be received in sealing engagement with the inner annular receiving surface. The inner ring also has a flange at its outermost end that extends outwardly from the first annular cylinder body and has a diameter that is larger than the inner diameter of the annular port ring. In various embodiments the flange is coupled to the outer enclosure assembly.

The access element can generally be either a plug or a glove with a glove support ring that is in sealing engagement within the first annular cylinder body, and is slidably removable there from. The glove and glove support ring generally provides an individual with a means to manually manipulate objects within the gloveport while still keeping the environment inside of the glovebox isolated from the environment outside of the glovebox. The plug generally just keeps the environment inside of the glovebox isolated from the environment outside of the glovebox. In various embodiments the access element is slidably removed through the use of an ejection tool.

What is also described herein is a method for retrofitting the annular port ring of a sealed enclosure of the type generally described above in order to provide improved exchange of access elements for use with the sealed enclosure. The outer enclosure assembly is installed surrounding the port ring and forms a sealed engagement with the outer annular surface of the port ring. The outer enclosure assembly has an inner annular receiving surface that is positioned at the outermost end of the port ring and is adjacent to an inner annular face of the port ring.

A change assembly that has an inner ring and an access element is provided. The inner ring generally has a first annular cylinder body having an outer diameter sized to be slidably and sealably received by the inner annular receiving surface and a flange extending outwardly from the first annular cylinder body. The inner ring also has an access element that is positioned within the first annular cylinder body in sealing engagement. The access element can generally be a plug or a combination of a glove and a glove support ring that is configured to be slidably removable from the first annular cylinder, as described above.

The innermost end of the change assembly is inserted into the outer enclosure assembly to form a sealing engagement with the inner annular receiving surface of the outer enclosure assembly. The change assembly is inserted until its flange, as described above, contacts the outer enclosure assembly. In various embodiments the change assembly ejects a component located in the annular port ring and a first glove into the enclosure when the change assembly is inserted into the annular port ring.

In another embodiment, a method of manufacturing a system for retrofitting a sealed enclosure includes forming the outer enclosure assembly, placing a compression seal against a compression seal mating surface of the outer enclosure assembly, forming the inner ring, and forming an access element configured to be positioned within the first annular cylinder body and in sealing engagement with the first annular cylinder body of the inner ring, wherein the access element is slidably removable from the first annular cylinder body.

In another embodiment, a system for retrofitting a sealed enclosure having an annular port ring is described where a ring housing includes an outer ring portion and an inner ring portion. The ring housing includes an outer ring portion and an inner ring portion, wherein the ring housing is configured to form a sealed engagement with an annular face of the port ring. The ring housing extends beyond the outermost end of the port ring. The inner ring portion of the ring housing includes a first annular cylinder body having an outer diameter sized to be slidably received by the port ring. The system also includes an access element configured to be positioned within the first annular cylinder body and in sealing engagement with the first annular cylinder body.

BRIEF DESCRIPTION OF THE DRAWINGS

The invention may be more completely understood and appreciated in consideration of the following detailed description of various embodiments of the invention in connection with the accompanying drawings.

FIG. 6 is a front perspective view of an outer enclosure ring.

FIG. 7 is a back perspective view of the outer enclosure ring of FIG. 6.

DETAILED DESCRIPTION

The present invention generally applies to systems for allowing access to a sealed enclosure for performing work within the sealed enclosure. The invention particularly applies to a sealed glove box system where the gloves can be changed, and alternatively, the opening can be covered and other items can be attached to the opening.

As discussed in the background, some prior art systems and methods for changing gloves in a glove box are difficult, time-consuming and present an increased risk of contamination compared to other systems. The prior art glove box system shown in FIG. 1 has several disadvantages. The invention particularly relates to a system that can be used to retrofit an existing glove box system like shown in FIG. 1 with structures that allow easier, safer replacement of gloves and attachment to the opening. First, the elements of the prior art system of FIG. 1 will be described. Then, a system and method for retrofitting the system of FIG. 1 will be described.

Figure 1:
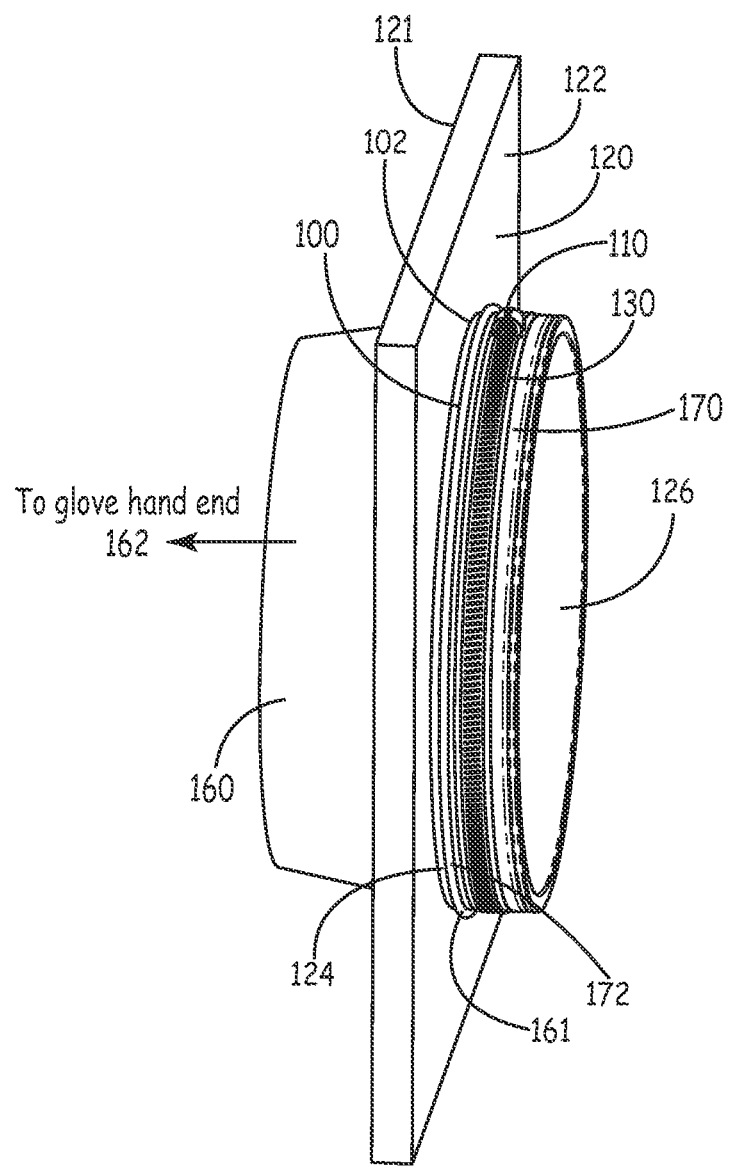
FIG. 1 is a perspective view of a prior art gloveport having a glove.

FIG. 1 is a perspective view of a prior art gloveport having a glove. A gloveport wall 120 separates the gloveport side 121 of the wall from the outside surface 122 of the glovebox. An annular port ring 100 is present in an opening 102 of the wall 120. The presence of a glove 160 provides access to the gloveport side 121 of the wall 120 without contamination of either the outside of the glovebox from the gloveport side 121 of the wall or of the gloveport side 121 of the wall from the outside of the glovebox. The annular port ring 100 is generally cylindrical and extends at least partially through the opening 102 defined by the thickness of the glovebox wall 120, and defines an outer annular surface 124 extending beyond the outside surface 122 of the glovebox wall 120.

The annular port ring 100 also defines an inner annular surface 126. The inner annular surface 126 of the annular port ring 100 is generally smooth. In this example of a port ring, the inner annular surface 126 does not include any protruding or recessed structure. The lack of protruding or recessed structure on the inner surface of the annular port ring is characteristic of the port rings of many pre-existing glove box systems for which changing access elements is difficult. However, the practice of the technology disclosed herein does not require a smooth structure on the inner surface of the port ring.

The length $l_1$ of the annular port ring in a typical prior art system can generally be at least about 3.2 centimeters to no more than about 4.3 centimeters and may be in a circular or ovular shape. More typically, the length $l_1$ of the annular port ring in a typical prior art system will be in a range from about 3.7 centimeters to about 3.9 centimeters. For a circular annular port ring, the diameter can generally be at least about 20.1 centimeters to no more than about 20.6 centimeters, or about 20.3 centimeters. The annular port ring can comprise a variety of materials, any of which are currently used in the art such as stainless steel, aluminum, plastics, and so on. Commonly a 300 series stainless steel is used.

The glove 160 has an outermost shoulder end 161 and in innermost hand end 162 that is configured to receive the hand of a user through an opening on the outermost shoulder end 161. In at least one embodiment, the glove comprises an impermeable flexible material such as low density polyethylene. The outermost shoulder end 161 of the glove 160 extends from the glovebox side of the wall 121, through the annular port ring 100, and is secured around the outer annular surface 124 of the port ring 100 with a rubber band 130 and a hose clamp 110.

The prior art process of installing a glove 160 into an annular port ring 100 will now be described. A glove 160 is inserted through the annular port ring 100 and into the glovebox side 121 of the glovebox wall 120. The open end of the existing glove 160 is folded over an exterior end 170 of the annular port ring 100 and secured to the outside annular surface 124 of the annular port ring 100. A means for securing the folded over exterior end of the glove 160 may be a neoprene or rubber band 130 that is further clamped down by a hose clamp 110 or any other suitable means for sealably securing the glove. A bead 172 is present at the outermost shoulder end 161 of the glove. Additional components may be used to sealably secure the glove 160.

Now one process of retrofitting the prior art system with the improved system of the present invention will be described. The removal of any components from the inner annular surface 126 of the annular port ring 100 is the first step in retrofitting the gloveport of FIG. 1 with an improved system. After removal, the outermost shoulder end 161 of the glove 160 remains secured to the annular port ring 100 with the hose clamp 110 and the rubber band 130. As a result, the glove box side of the wall 121 remains isolated from the outside of the glovebox 122.

A replacement glove sealing ring can be inserted into the gloveport. The replacement glove sealing ring is annular and defines an inwardly extending flange. The flange generally extends inwardly from the annular body 149 of the replacement glove sealing ring. The outer diameter of the annular surface 153 of the replacement glove sealing ring is generally configured to be received by the annular port 100. The annular surface 153 defines three ridges that are configured to have sealing and slide-able engagement with the inner diameter of the annular port and exert localized compression force on the outermost shoulder end of a glove that is disposed between the replacement glove sealing ring and the annular port. In various embodiments there are one, three, or more ridges defined by the replacement glove sealing ring.

The replacement glove sealing ring can generally be made of any material known in the art. In various embodiments the replacement glove sealing ring is made of a molded plastic. In various embodiments the replacement glove sealing ring is made of a molded low density polyethylene.

After the replacement glove sealing ring is placed, the hose clamp 110 and rubber band 130 depicted in FIG. 1 can be removed to release the outermost shoulder end 161 of the glove from the outside diameter of the annular port ring. Releasing the outermost shoulder end of the glove from the outside diameter of the annular port ring exposes the outside surface of the annular port ring. In various embodiments it can be advantageous to clean and/or sterilize the outside surface of the annular port ring to contain any contaminants from the interior of the glove box that have contacted the outer surface of the annular port ring. The outermost shoulder side of the glove can then be placed within the inner diameter of the replacement glove sealing ring. In one embodiment the replacement glove sealing ring includes clips or snaps that couple to the outermost shoulder side of the glove 160.

At this point of the retrofitting process, the replacement glove sealing ring is in position within the gloveport 100, the hose clamp 110 and rubber band 130 have been removed, and the shoulder end 161 of the glove has been placed within the inner diameter of the replacement glove sealing ring. Next, an outer enclosure assembly is clamped to the outer annular face of the annular port ring 100. Then a change assembly is inserted into the outer enclosure assembly. The change assembly forms a sealing engagement between the change assembly and an inner annular receiving surface of the outer enclosure assembly. The outermost shoulder end of the glove, which had been previously placed within the inner diameter of the replacement glove sealing ring, is trapped between the flange of the replacement glove sealing ring and the change assembly. The change assembly also pushes against the flange of the replacement sealing ring so that the replacement sealing ring and the old glove are pushed into the interior of the glove box.

There can be a variety of approaches to retrofitting the prior art system, as will be appreciated by those of ordinary skill in the art.

Figure 2:
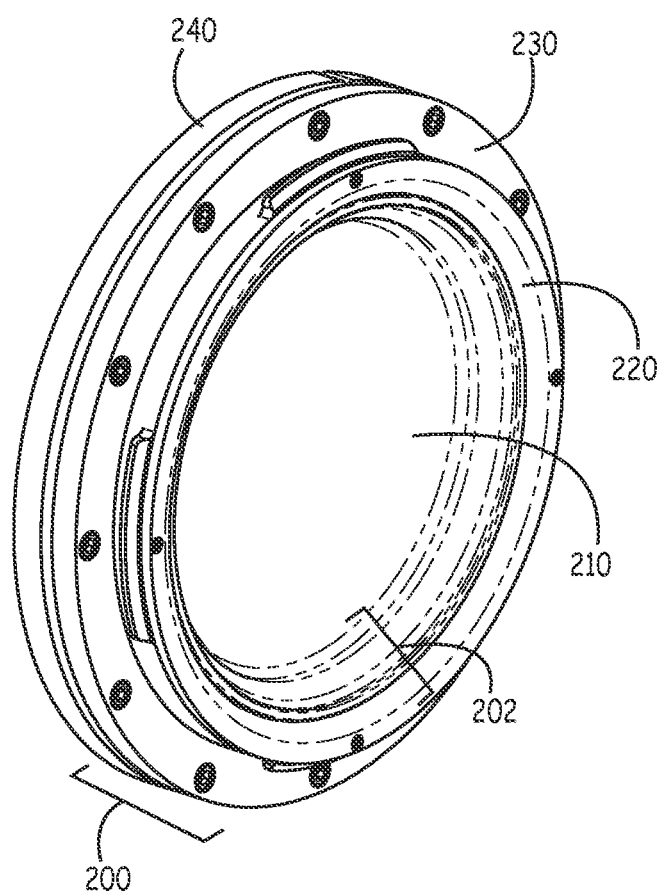
FIG. 2 is a perspective view of an assembled retrofit assembly with a plug.

The structures of outer enclosure assembly and various change assemblies will now be described. FIG. 2 is a perspective view of an assembled retrofit assembly having an outer enclosure assembly 200 and a change assembly 202. The change assembly 202 includes an inner ring 220 and a plug 210 that is in sealing engagement with the inner ring 220. The change assembly is slide-ably received by the annular port ring 100 (shown in FIG. 1) and the outer enclosure assembly 200. The plug 210 can also be referred to as an "access element" for purposes of this application. In other embodiments that will be discussed herein, the change assembly includes a glove support ring and a new glove instead of a plug. In these embodiments, the glove support ring and the new glove are the access element.

The outer enclosure assembly 200 is clamped to the outer annular face of the annular port ring and forms a sealing engagement with the outer annular surfaces of the port ring. The outer enclosure assembly 200 can extend beyond the outermost end of the port ring and further define an inner annular receiving surface that is positioned at the outermost end of the port ring, as will be further illustrated in FIG. 5. The outer enclosure assembly 200 comprises at least a split retaining flange 240, an outer enclosure ring 230, in addition to other structures in various embodiments.

Figure 3:
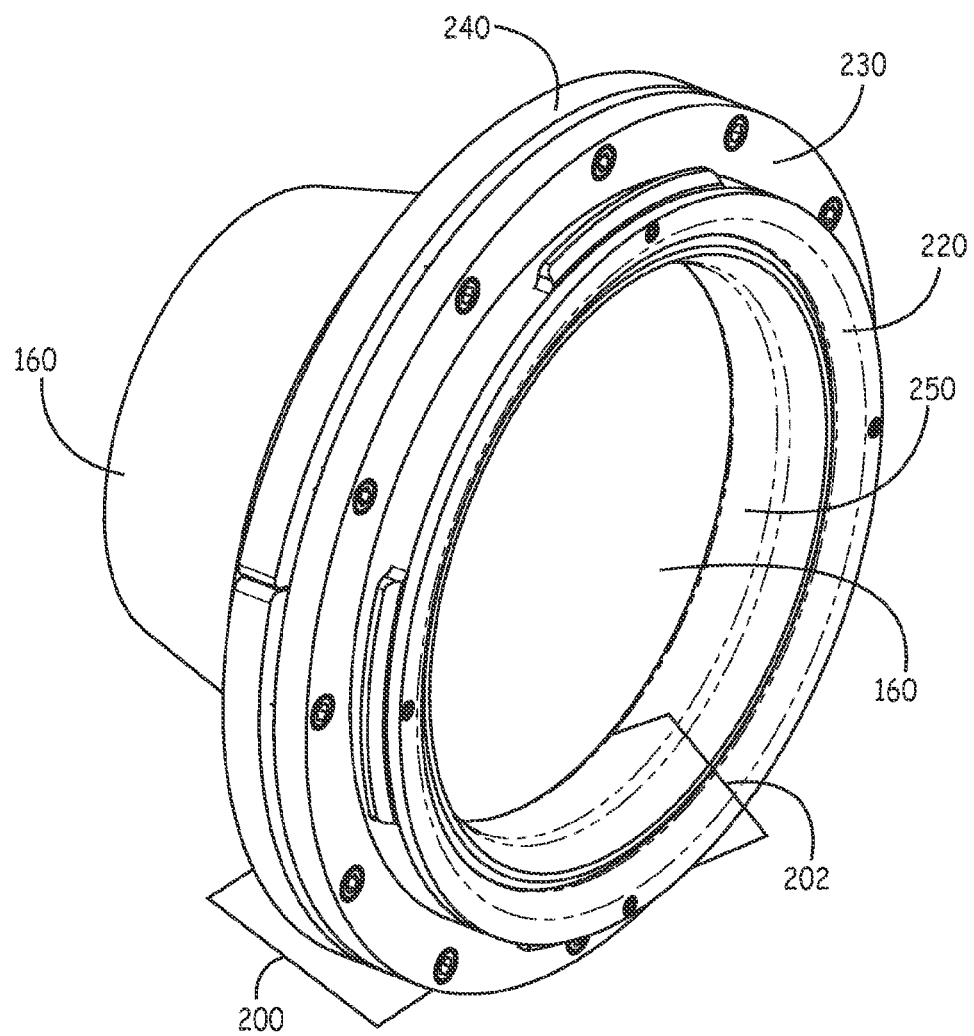
FIG. 3 is a perspective view of an assembled retrofit assembly with a glove.

FIG. 3 is a perspective view of an assembled retrofit assembly with a glove 160 and an inner ring in place of a plug. The outer enclosure assembly 200 is configured to be disposed on the outer annular face of the annular port ring (depicted in FIG. 1). The outer enclosure assembly 200 comprises at least a split retaining flange 240 and an outer enclosure ring 230. An access element having at least a glove 160 and an inner ring 220 is received by the annular port ring and the outer enclosure assembly 200. A support ring 250 having an annular cylindrical surface is disposed on the inside annular surface of the inner ring 220. The outermost shoulder side of the glove is trapped between the support ring 250 and the inner ring 220.

Figure 4:
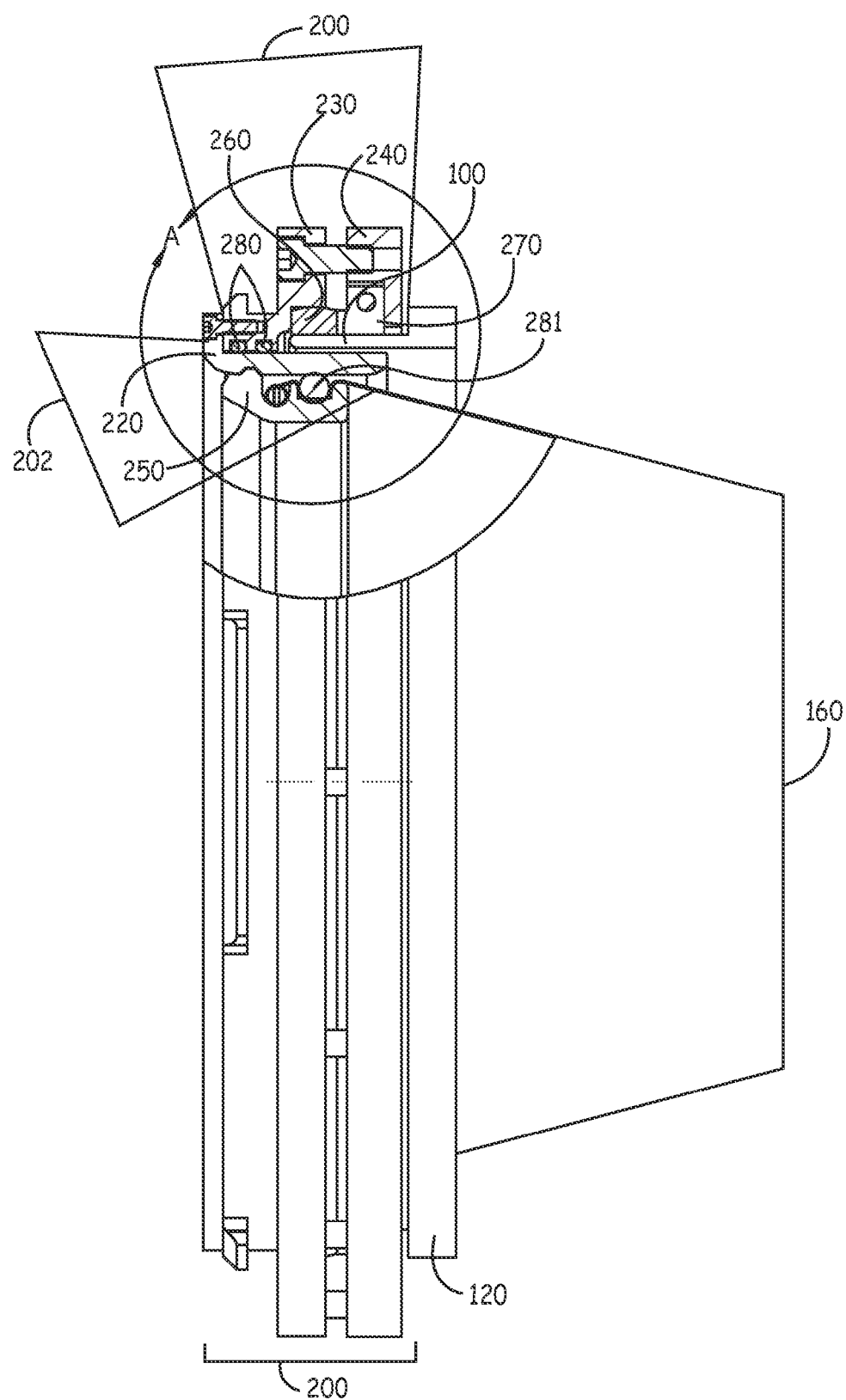
FIG. 4 is a side view of the assembled retrofit assembly of FIG. 3, with a cross sectional cutaway view near portion A.
Figure 5:
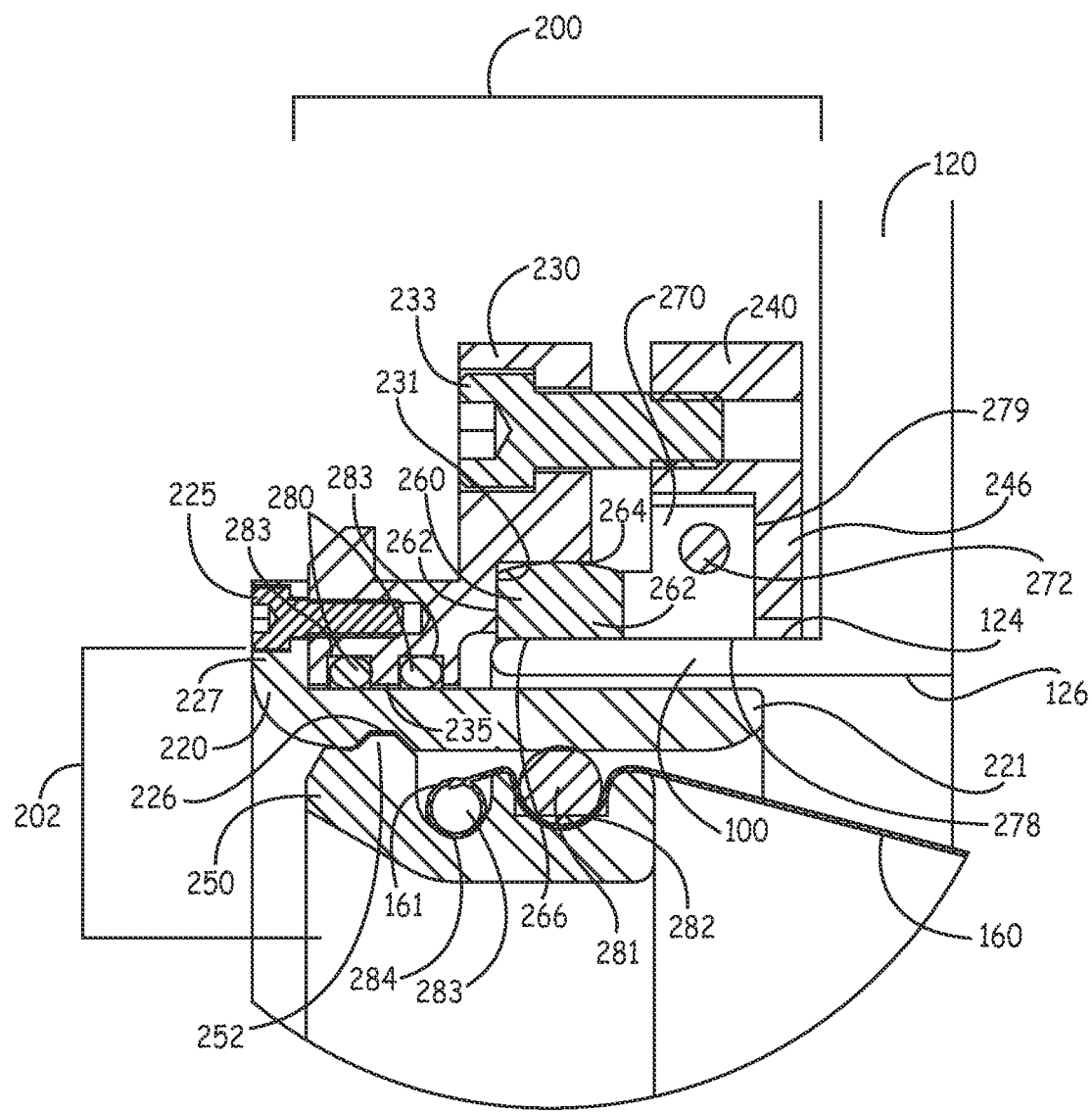
FIG. 5 is an enlarged cross sectional view of portion A from FIG. 4.

FIG. 4 is a side view of the assembled retrofit assembly of FIG. 3 with a cutaway portion in a cross sectional view. FIG. 5 is an enlarged cross sectional view of portion A from FIG. 4. From this view it is discernable that the outer enclosure assembly 200 is disposed on the annular port ring 100 and forms a sealed engagement with the outer annular surface of the port ring 100. The outer enclosure assembly 200 includes at least a split retaining flange 240, a split clamping ring 270, a compression seal 260, and an outer enclosure ring 230. Outer enclosure ring 230 is coupled to the split retaining flange 240 with screws 233, although other methods of coupling would be consistent with the technology disclosed herein. The compression seal 260 is an annular seal disposed between the outer enclosure ring 230 and the annular port ring 100 and provides a seal between the outer enclosure ring 230 and the annular port ring 100.

The outer enclosure assembly includes an inner annular receiving surface 235, which is in contact with the outer surface of the change assembly. The inner annular receiving surface 235 is located at the outermost end of the port ring 100, and extends beyond the inner annular surface of the port ring 100.

The change assembly includes an inner ring 220, a glove support ring 250 and a glove 160 in the embodiment of FIG. 5. An inner ring 220 is coupled to the outer enclosure ring 230 with screws 225 in this embodiment, although in other embodiments coupling can be achieved through any means known in the art. A cylindrical portion 221 of the inner ring 220 is slidably disposed in the annular ring 100 and the outer enclosure ring 230. The flange 227 defined by the inner ring 220 extends outwardly from the cylindrical portion 221 and is in physical contact with the outer enclosure ring 230 to enable coupling. One or more o-rings 280 are disposed between the inner annular receiving surface 235 of the outer enclosure ring 230 and the inner ring 220 to provide a seal. The inner annular receiving surface 235 of the outer enclosure ring 230 is configured to slidably and sealably receive the inner enclosure ring 220. The outer enclosure ring 230 and inner enclosure ring 220 in this embodiment form a seal by virtue of the outer enclosure ring 230 defining two openings to receive two o-rings 280 that are partially compressed between the inner annular receiving surface 235 of the outer enclosure ring 230 and the inner enclosure ring 220.

A glove support ring 250 is disposed within an inner opening of the inner ring 220. The glove support ring 250 and the inner ring 220 can have corresponding mating surfaces. A shoulder 252 defined by the support ring 250 is configured to mate with a mating groove 226 of the inner ring 220. Such mating ensures a secure seal between the support ring 250 and the inner ring 220.

The height of the shoulder 252 in various embodiments is at least about 0.8 millimeters to no more than about 1.3 millimeters, and is 1.1 millimeters in a particular example. The length of the shoulder 252 in various embodiments is at least about 4.6 millimeters to no more than about 5.3 millimeters, and is 4.9 millimeters in a particular example.

In this particular embodiment, an o-ring 281 is disposed between the glove support ring 250 and the inner ring 220. The o-ring 281 fits into a groove 282 on the outer surface of the glove support ring 250. The glove is trapped between the o-ring 281 and the outer surface of the glove support ring 250, and serves to secure the glove 160 to the glove support ring 250. A bead 283 is present at the outermost shoulder end 161 of the glove 160, and fits into a groove 284.

Figure 13:
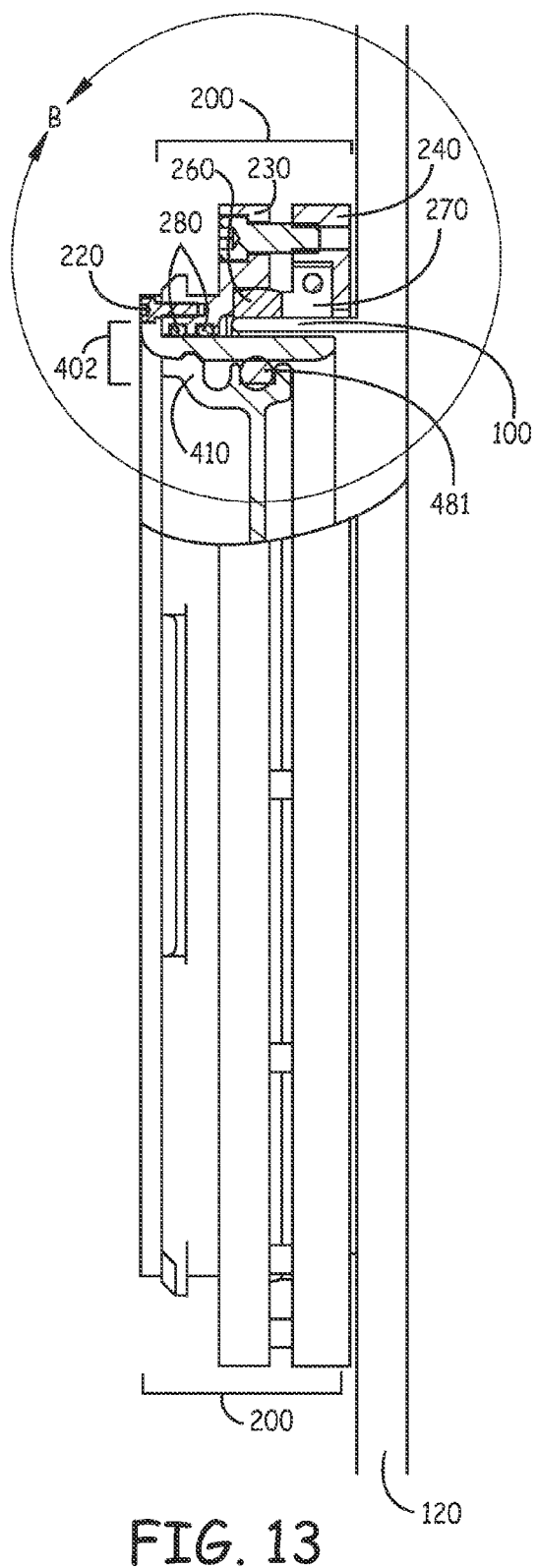
FIG. 13 is a side view of the assembled retrofit assembly of FIG. 2, with a cross sectional cutaway view near portion B.
Figure 14:
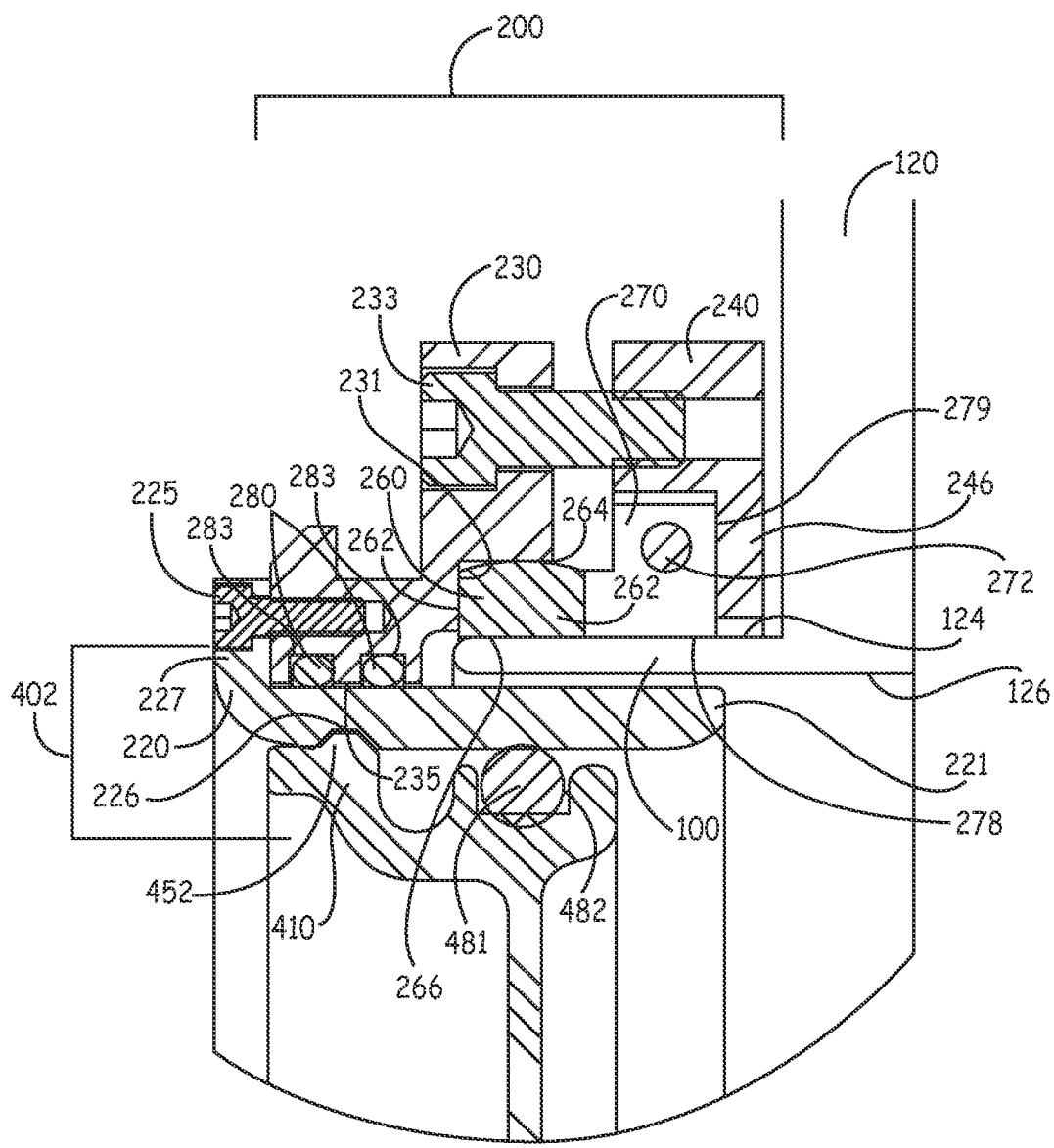
FIG. 14 is an enlarged cross sectional view of portion B from FIG. 13.

FIG. 13 is a side view of the assembled retrofit assembly of FIG. 2 with a cutaway portion in a cross sectional view. FIG. 14 is an enlarged cross sectional view of portion B from FIG. 13. FIGS. 13 and 14 vary from the embodiment depicted in FIGS. 4 and 5, discussed above, at least in that the access element of the change assembly 402 is a plug 410, rather than the glove 160 and glove support ring 250 as depicted and discussed in FIGS. 4 and 5. Similar to the embodiment shown in FIGS. 4 and 5, an outer enclosure assembly 200 is disposed on the annular port ring 100 and forms a sealed engagement with the outer annular surface of the port ring 100. The outer enclosure assembly 200 includes at least a split retaining flange 240, a split clamping ring 270, a compression seal 260, and an outer enclosure ring 230. Also similar to the embodiment shown in FIGS. 4 and 5, a flange 227 of an inner ring 220 is coupled to the outer enclosure ring 230 and slidably disposed in the annular ring 100 and the outer enclosure ring 230.

The plug 410 is disposed within the inner opening of the inner ring 220 and defines a surface that blocks the opening of the inner ring 220. The plug 410 is generally circular. The plug 410 and the inner ring 220 can have corresponding mating surfaces. A shoulder 452 defined by the plug 410 is configured to mate with a mating groove 226 of the inner ring 220. Such mating ensures a secure seal between the shoulder 410 and the inner ring 220. The height and length of the plug shoulder 452 can be similar or the same to corresponding parameters of the shoulder of the glove support ring discussed above with regard to FIGS. 4 and 5. An o-ring 481 is disposed between the plug 410 and the inner ring 220, much the same way that an o-ring is disposed between the glove support ring and the inner ring, discussed above. The o-ring 481 fits into a groove 482 on the outer surface of the plug 410, and is compressed between the inner ring 220 and the plug 410, forming a seal.

The components of the outer enclosure assembly will now be described in more detail with respect to FIGS. 6, 7 and 9-11. FIG. 6 is a front perspective view of the outer enclosure ring 230, while FIG. 7 is a back perspective view of the outer enclosure ring 230. The outer enclosure ring 230 is generally annular and configured to couple to the split retaining flange 240 (depicted in FIGS. 4 and 5) and additionally couple to the inner ring 220 (depicted in FIG. 4 and FIG. 8). The outer enclosure ring 230 can include virtually any material known in the art such as various metals and plastics. In one embodiment the outer enclosure ring 230 includes aluminum or steel. In another embodiment the outer enclosure ring 230 includes steel.

The inner diameter of the outer enclosure ring 230 is configured to accommodate the compression seal 260 (depicted in FIG. 4 and FIG. 5) therein, and the annular port ring within the compression seal 260. Clearance holes 232, 236 for screws are disposed along the surface of the outer enclosure ring 230 to enable coupling to the inner ring and the split retaining flange 240, respectively. Bayonet-style connectors 234 are circumferentially disposed on the outer enclosure ring 230 to interface with at least an ejection tool, for example, which is described in the discussion of FIG. 12, below. The outer enclosure ring 230 additionally defines the inner annular receiving surface 235, which will seal against the inner ring. The inner receiving surface 235 has o-ring grooves 238 that are configured to receive one or more o-rings, which will assist with the seal with the inner ring. From the perspective of FIG. 7, which is a back perspective view of the outer enclosure ring of FIG. 6, a compression seal mating surface 231 is visible. The compression seal mating surface 231 is configured to receive the compression seal 260, shown in FIG. 5.

Figure 9:
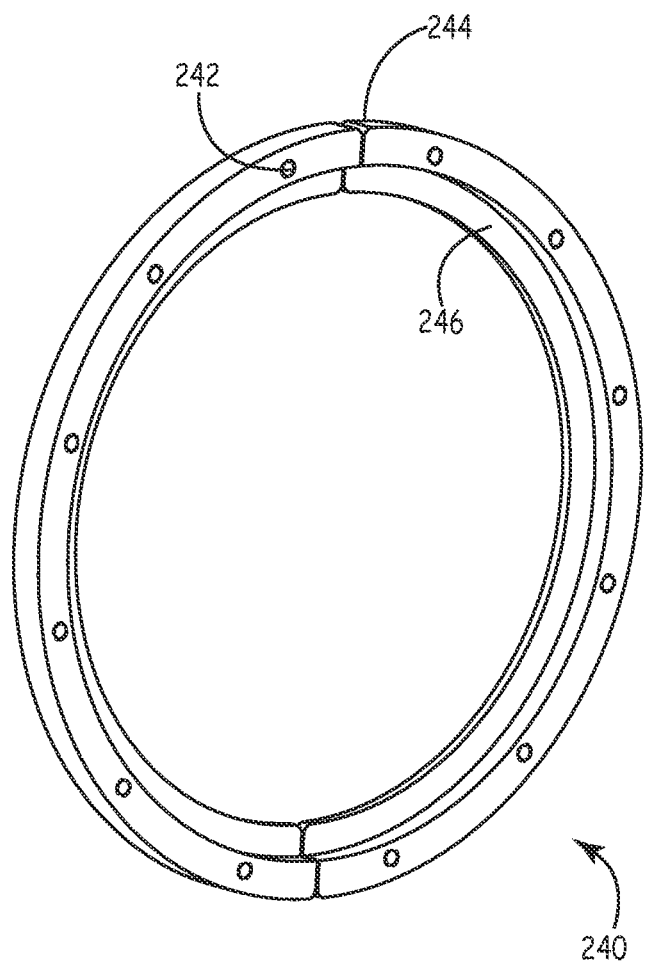
FIG. 9 is a perspective view of the split retaining flange.

FIG. 9 is a perspective view of the split retaining flange. The split retaining flange 240 has two splits 244 that aid in installation around the annular port ring (see FIG. 5) so that each half can be set over the annular port ring and the split clamping ring (which is described in detail in the description of FIG. 10, below). The split retaining flange 240 can include virtually any material known in the art such as various metals and plastics. The split retaining flange 240 defines an annular flange 246 extending within the inner diameter of the split retaining flange 240. The flange 246 is configured to bear against the split clamping ring 270 (see FIG. 5) when tightened down. The split retaining flange 240 is configured to be coupled to the outer enclosure ring 230 (see FIG. 5). In this embodiment, clearance holes 242 defined around the diameter of the split retaining flange 240 are configured to receive screws 233 that couple to the outer enclosure ring 230.

Figure 10:
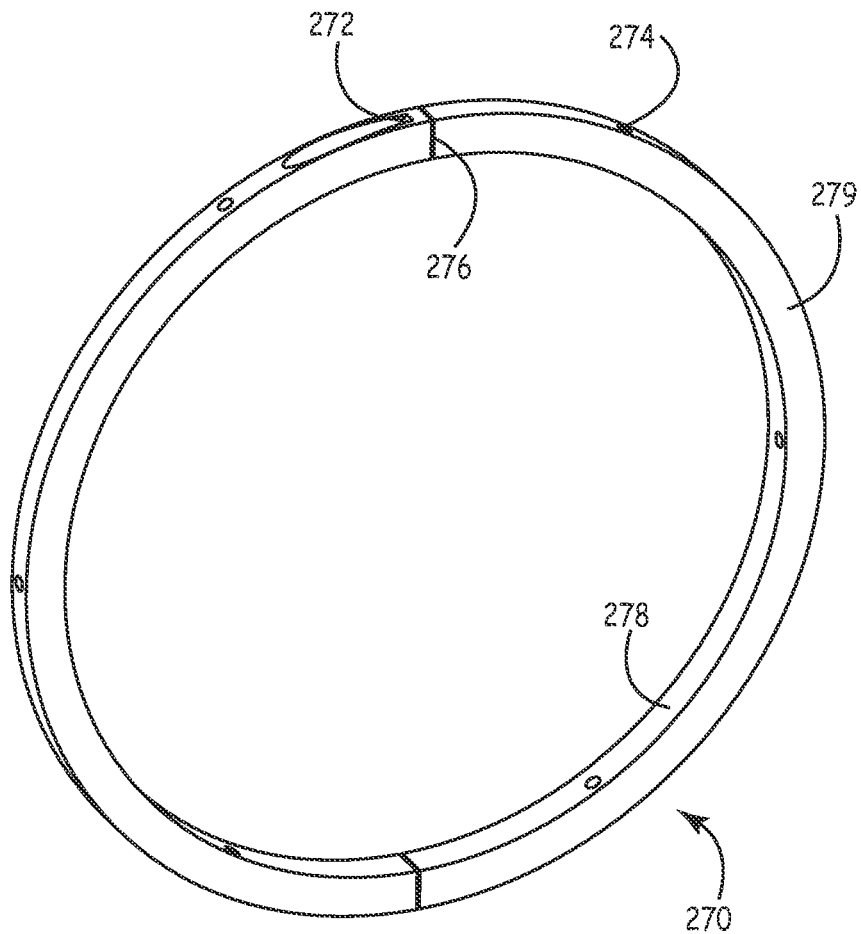
FIG. 10 is a perspective view of the split clamping ring.

FIG. 10 is a perspective view of the split clamping ring. The split clamping ring 270 has two splits 276 to aid in ease of installation of the split clamping ring 270 around the annular port ring 100 (see FIG. 5). The split clamping ring 270 can include virtually any material known in the art such as various metals and plastics. Two screws 272 substantially perpendicular to the split are used to tighten the split clamping ring 270 about the annular port ring 100. Set screws 274 disposed along the perimeter of the split clamping ring 270 are used to lock the clamping ring into place around the annular port ring 100. The inner diameter surface 278 of the split clamping ring 270 bears down on the annular port ring 100 when locked into place. The leading face 279 of the split clamping ring 270 bears up against the split retaining flange 240 when the split retaining flange is set into place, as depicted in FIG. 5.

Figure 11:
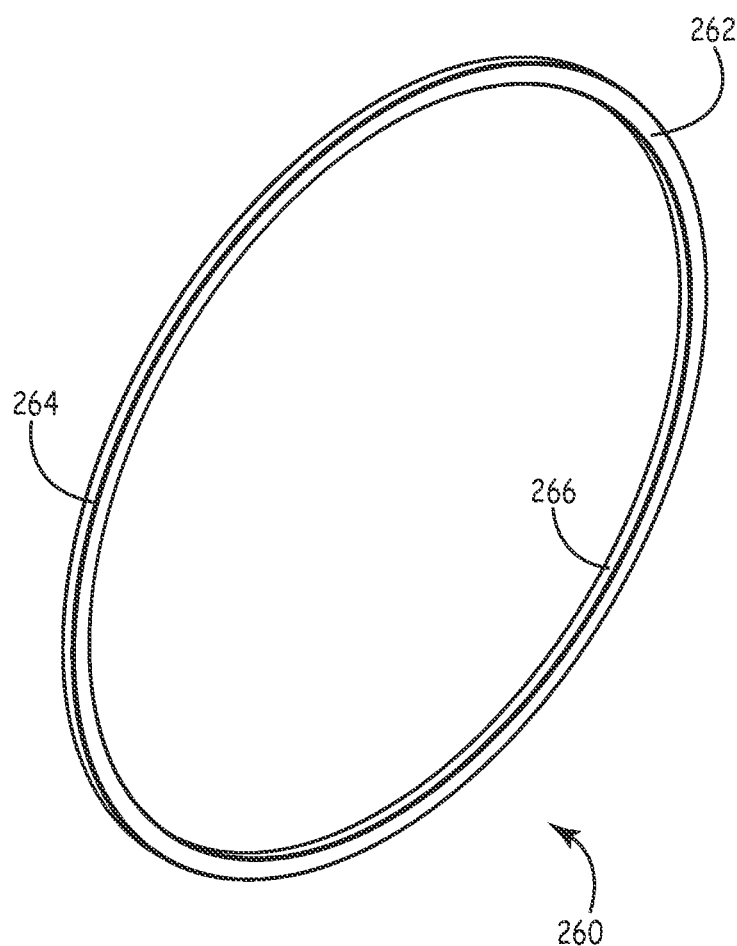
FIG. 11 is a perspective view of the compression seal.

FIG. 11 is a perspective view of the compression seal. The compression seal 260 has an outer diameter 264, an inner diameter 266, and faces 262. The outer diameter 264 compresses up against the inner diameter of the outer enclosure ring 230 (see FIG. 5). The compression seal can include various compressible materials such as types of rubber, or various types of polymers. The inner diameter 266 of the compression seal 260 is compressed against the outer diameter of the annular port ring 100 (see FIG. 5). The faces 262 of the seal compress against the outer face of the split clamping ring 270 and the inner face of the outer enclosure ring 230. Such placement of the compression seal 260 provides sealed coupling between the outer enclosure ring 230 and the annular port ring 100 (see FIG. 5).

Now that the components of the outer enclosure assembly have been described in detail, the inner ring will be described with reference to FIG. 8, which is a perspective view of the inner ring 220. The inner ring 220 has a first annular cylinder body 221 and a flange 222 extending outwardly. The inner ring 220 can comprise any material known in the art such as various metals and plastics. The annular cylinder body 221 has an outer diameter sized to be slidably received by the annular port ring 100 (see FIG. 4 and FIG. 5). The flange 222 outer diameter is larger than the inner diameter of the annular port ring 100 (see FIG. 4 and FIG. 5).

The inner ring 220 has a leading face 228 side that is pushed into the annular port ring. The leading face 228, when slid into the annular port ring comes into contact with the replacement glove sealing ring and slides the replacement glove sealing ring out of the annular port ring 100 into the glove box side of the wall. In various embodiments the leading face 228 traps the outermost shoulder side of the old glove between the leading face 228 and the replacement glove sealing ring. The flange 222 prevents translation of the first annular cylinder body 221 further in the annular port ring when the flange makes contact with the outer enclosure ring. The inner ring 220 additionally has a groove 226 that is configured to receive a shoulder 252 of a support ring 250 as depicted in FIG. 5, or a shoulder of a plug as depicted in FIG. 2. The inner ring 220 also defines clearance holes 224 for screws that fasten to the outer enclosure ring as depicted in FIG. 5.

Figure 12:
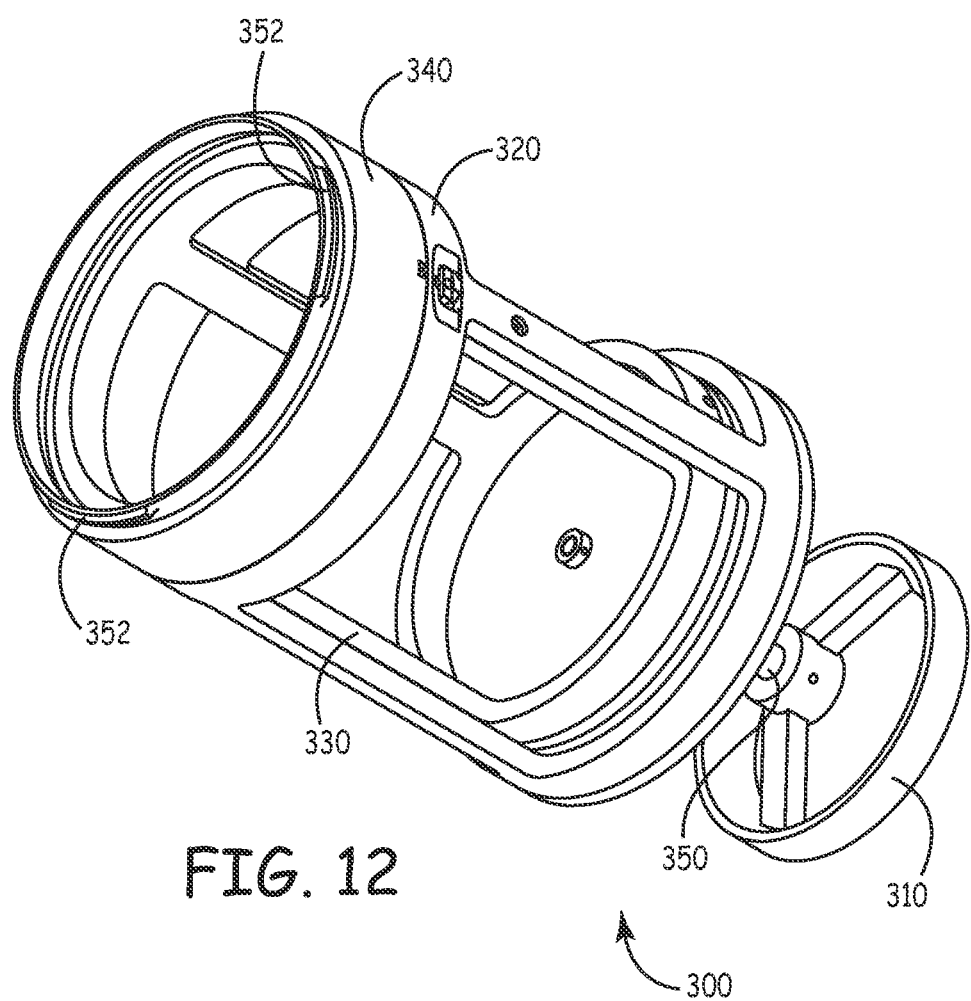
FIG. 12 is a perspective view of an ejection tool.

FIG. 12 is a perspective view of an ejection tool. An ejection tool 300 is used in various embodiments of the technology disclosed herein to eject or load a new glove ring or a plug to the annular port ring. The ejection tool 300 includes a collar 340, an outer cage 320, an inner cage 330, a hand wheel 310, and a ball screw 350. Rotation of the hand wheel 310 results in rotation of the ball screw 350, which drives the inner cage 330 forward relative to the outer cage 320 and the collar 340. In operation, a new glove ring or plug is loaded into the collar 340. The ejection tool 300 is docked to the outer enclosure assembly via the bayonet connections 234 of the outer enclosure ring 230 as depicted in FIG. 3, which mount onto the bayonet connections 352 of the ejection tool 300. The hand wheel 310 is then turned, thereby moving the inner cage 330 in the direction of the glove box interior, forcing the new glove ring (or plug) through the collar 340 and into the annular port ring and outer enclosure ring. Such action pushes out the old glove support ring (or plug) without breaking the leak tightness of the overall assembly. The o-ring 281 installed on the new glove support ring 250 will make contact with the inner annular surface of the inner ring 220 before the o-ring 281 installed in the old glove support ring 250 loses its sealing contact with the inner ring 220. Many alternate structures are possible for the ejection tool.

The method for installing the outer enclosure assembly 200 and the change assembly 202 to the annular port ring 100 consistent with the embodiments of the technology depicted in FIGS. 1-11 will now be described.

First, any structures on the outer annular face 124 of the annular port ring 100 are removed. Next, the outer enclosure assembly is clamped to the outer annular face 124 of the annular port ring 100. This process will be described with reference to FIGS. 5-7 and 9-11. This is achieved by first installing the split clamping ring 270 over the annular port ring 100. Installation includes engaging split clamping ring screws 272 when the split clamping ring is positioned properly over the annular port ring 100 for a substantially secure attachment. The split retaining flange 240 is positioned over the annular port ring so that the flange 246 of the split retaining flange 240 abuts the leading face 279 of the split clamping ring 270. The compression seal 260 is then positioned so that one face 262 of the compression seal abuts the split clamping ring 270 and the inner diameter 266 of the compression seal 260 abuts the outer annular surface of the annular port ring 100. The outer enclosure ring 230, having the compression seal mating surface 231, is then placed over the compression seal 260 so that the compression seal mating surface 231 mates with at least one face 262 and the outer diameter 264 of the compression seal 260. The outer enclosure ring 230 is then coupled to the split retaining flange 240 with screws 233 to substantially secure the assembly around the annular port ring 100 through compression forces.

Once the outer enclosure assembly 200 has been installed, an inner receiving surface 235 is present at the outermost end of the annular port ring 100. The inner receiving surface 235 defines grooves 238 for receiving o-rings 280, which provide the sealing structure against the outer surface of the inner ring 220.

Now that the installation of the outer enclosure assembly has been described, the installation of a change assembly will be described. The change assembly 202 includes the inner ring 220 and an access element. As previously described herein, the access element may be a plug 210 as shown in FIGS. 2, 13 and 14 that serves to cover the port opening. Alternatively, the access element may be a glove support ring 250 and glove 160 as illustrated in FIGS. 3-5. It is also possible to have a bag element positioned in the inner ring. Before installation into the glove port box, the inner ring 220 has the access element positioned in its interior in a sealed relationship. The access element is sealed to the inner annular surface of the inner ring 220 by virtue of a shoulder structure, such as shoulder 252 shown in FIG. 5, which fits into the groove 226 on the inner annular surface of the inner ring 220.

To install the change assembly 202, the inner ring 220 is inserted into the outer enclosure assembly 200 and the annular port ring 100. The inner enclosure ring 220 is pushed through the inner diameter of the outer enclosure ring 230 and the annular port ring 100. The outer surface of the inner ring 220 contacts the o-rings 280 of the inner receiving surface 235. The distal end of the cylindrical surface 221 of the inner enclosure ring 220 makes contact with the replacement glove sealing ring and pushes the replacement glove sealing ring through the annular port ring 100 into the glovebox 121 as the inner enclosure ring 220 is being inserted in the annular glove ring 100. The flange 227 of the inner enclosure ring 220 is then coupled to the outer enclosure ring 230 with screws 225.

Once the installation of the outer enclosure assembly and the change assembly as described herein is complete, the glove box port possesses structures that facilitate changing an access element such as a glove with ease and in a safer manner. The changing of access elements within the inner ring of the change assembly will now be described. FIG. 5 illustrates a close-up cross-sectional view of an annular port ring 100 having an outer enclosure assembly 200 installed, and a change assembly installed including a glove support ring 250 and a glove 160. Periodically, the glove 160 may be replaced with a new glove. To accomplish this, a new glove 160 is installed on a new glove support ring 250. First, the bead 283 at the outermost shoulder end 161 of the new glove 160 is positioned in the groove 284. Then, the o-ring 281 is positioned in the groove 282, trapping the glove 160 between the o-ring and the outer surface of the glove support ring 250. The glove support ring assembly, including the glove 160 and o-ring 281, is then loaded into an ejection assembly like the one illustrated in FIG. 12. Then, the procedures described with respect to FIG. 12 are followed to insert the glove support ring assembly into the inner ring, thereby ejecting the old glove support ring assembly into the glove port box.

Alternately, a plug 210 is loaded into the ejection assembly of FIG. 12, and the plug is inserted into the inner ring, thereby displacing the old glove support ring assembly.

Figure 15:
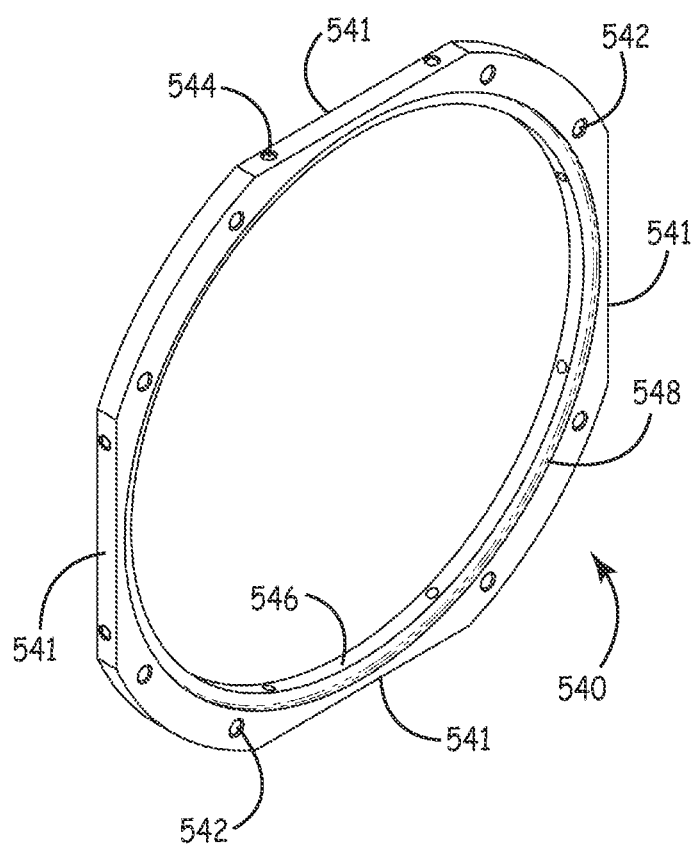
FIG. 15 is a perspective view of a retaining flange of an assembly consistent with an additional embodiment of the current technology.

Components of the system described herein can have a variety of embodiments and implementations and remain within the spirit and scope of the current technology. Now some alternative embodiments associated with components of the current system will be described. FIG. 15 is a perspective view of a retaining flange of an assembly consistent with an additional embodiment of the current technology.

Unlike the split retaining flange, described in detail in the discussion associated with FIG. 9, the retaining flange 540 is not "split" and is a single, unitary ring that is configured to accommodate the outer diameter of an annular port ring. The retaining flange 540 can include virtually any material known in the art such as various metals and plastics. In the embodiment depicted in the current figure, the retaining flange 540 defines at least four substantially flat surfaces 541 along its outer circumference. The retaining flange 540 also defines an annular flange 546 extending within the inner diameter of the retaining flange 540.

The retaining flange 540 is configured to bear against a compression seal as described in the discussion of FIG. 11, above, and as will be described in the discussion of FIG. 20, below. In the current embodiment, a compression seal opening 548 is defined by the leading face of the annular flange 546 and the bottom face of the retaining flange 540, relative to the installed position of the retaining flange 540 on an annular port ring, as can be observed in FIGS. 21-22. The bottom surface of the annular flange 546 is configured to face the outer surface of the annular port ring, and the leading surface of the retaining flange 540 is configured to face an outer enclosure ring.

The retaining flange 540 is generally coupled to an outer enclosure ring of the embodiment described above in the discussion of FIGS. 6-7, or the embodiment described in the discussion of FIGS. 16-17, below. In this embodiment, clearance holes 542 defined around the diameter of the retaining flange 540 are configured to receive screws that couple to the outer enclosure ring. Set screw openings 544 defined by the retaining flange 540 around its circumference are configured to receive set screws that mutually engage the retaining flange 540 and the outer surface of the annular port ring. In the embodiment depicted in the current figure, set screw openings 544 are defined on the substantially flat surfaces 541 defined by the outer circumference of the retaining flange 540, although alternative positions for the set screws are also contemplated.

Figure 16:
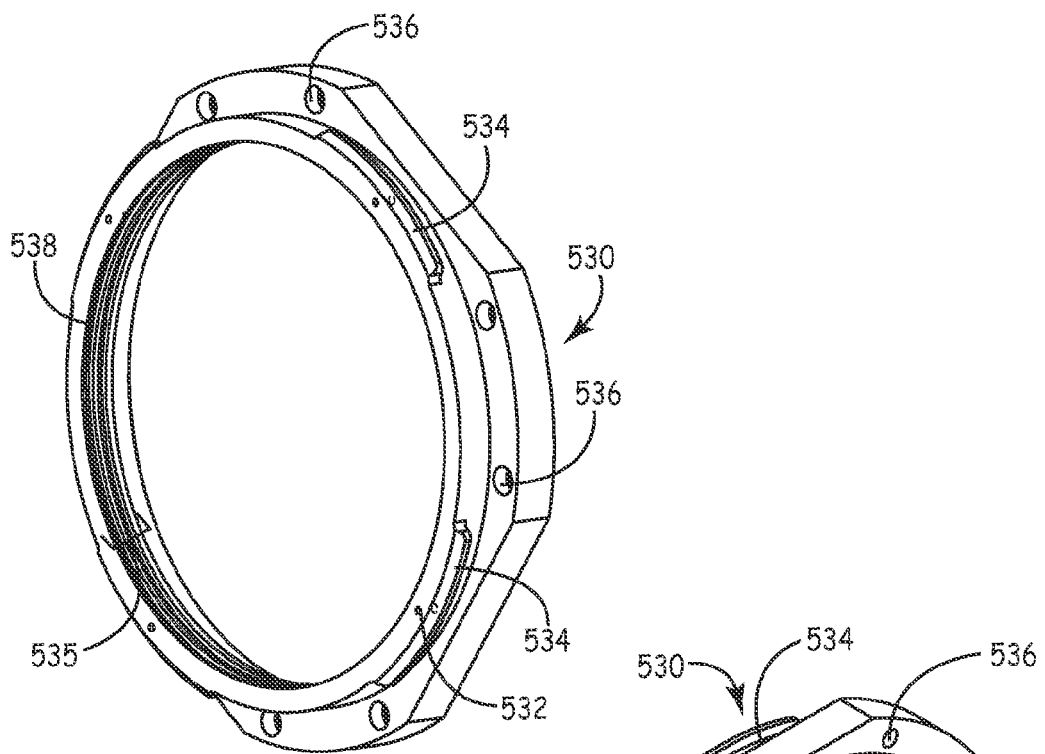
FIG. 16 is a front perspective view of an outer enclosure ring of an assembly consistent with an additional embodiment of the current technology.
Figure 17:
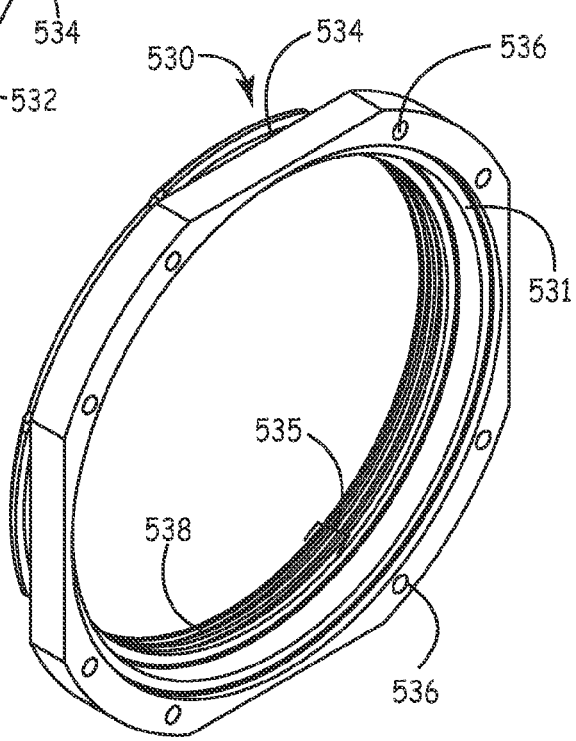
FIG. 17 is a back perspective view of the outer enclosure ring of FIG. 16.

FIG. 16 is a front perspective view of an outer enclosure ring of an assembly consistent with an additional embodiment of the current technology, and FIG. 17 is a back perspective view of the outer enclosure ring of FIG. 16. The outer enclosure ring 530 depicted can be used in conjunction with components of a variety of embodiments, including the retaining flange described above in the discussion of FIG. 15, or the split retaining flange and the split clamping ring described above in the discussion of FIGS. 9-10, as illustrative examples.

The inner diameter of the outer enclosure ring 530 is configured to exert force on a compression seal and, therefore, an annular port ring. The outer enclosure ring defines clearance holes 532, 536 for screws, which are disposed along the surface of the outer enclosure ring 530 to enable coupling to the retaining flange 540, for example, or other components as described above. Bayonet-style connectors 534 are circumferentially disposed on the outer enclosure ring 530 to interface with at least an ejection tool.

The outer enclosure ring 530 additionally defines the inner annular receiving surface 535, which will seal against an inner ring. The inner receiving surface 535 has o-ring grooves 538 that are configured to receive one or more o-rings, which will assist in creating a seal with the inner ring. From the perspective of FIG. 17, which is a back perspective view of the outer enclosure ring of FIG. 16, a compression seal mating surface 531 is visible. The compression seal mating surface 531 is configured to receive the compression seal.

Figure 18:
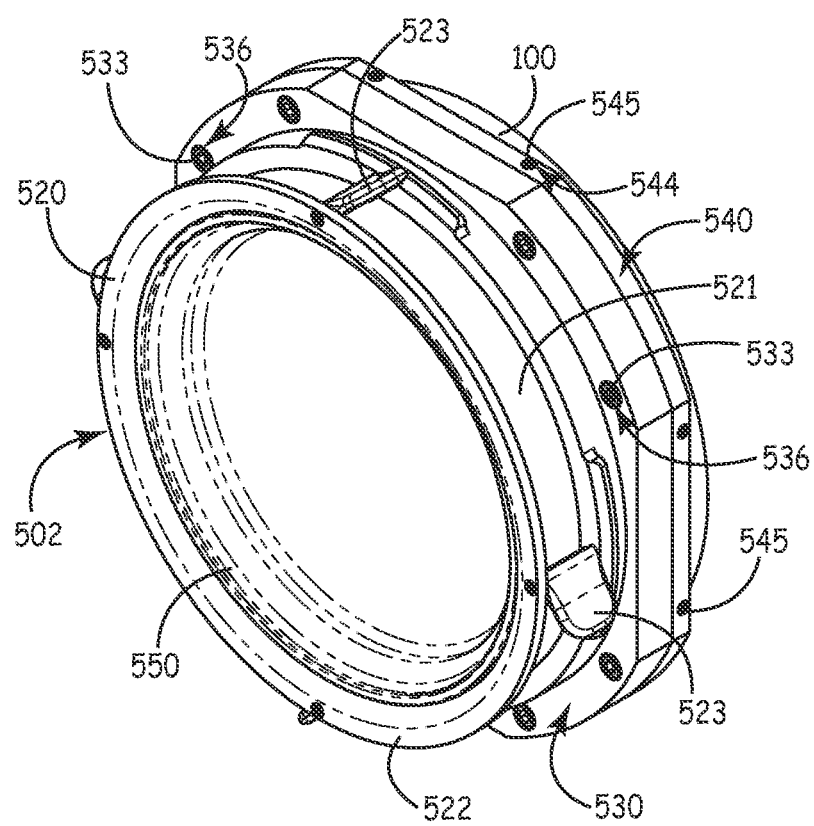
FIG. 18 is a perspective view of one embodiment of the retrofit assembly with the change assembly ready-to-install.
Figure 19:
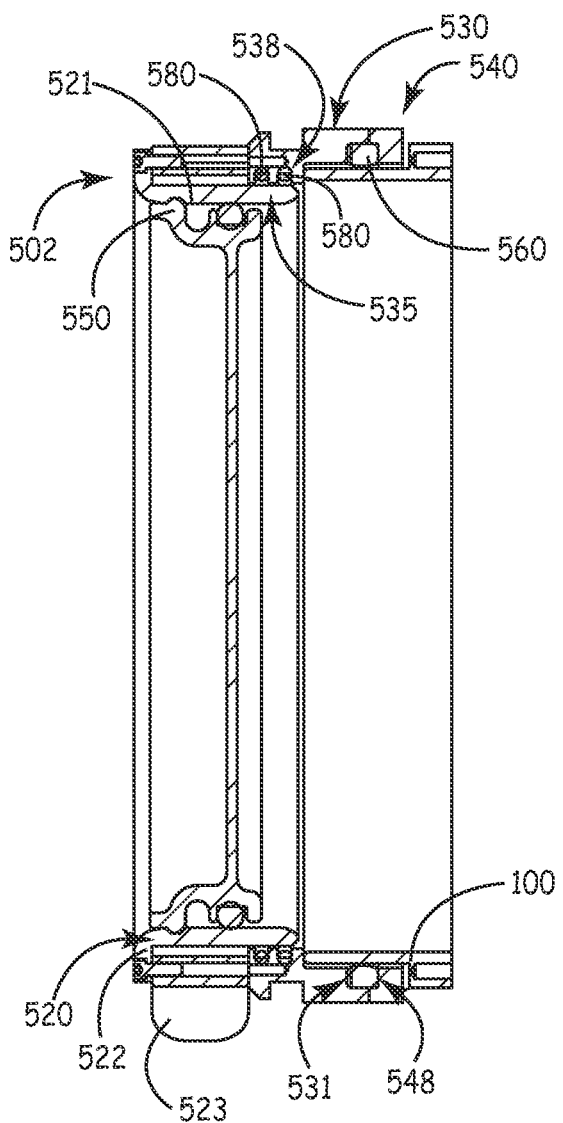
FIG. 19 is a cross-sectional view of the embodiment of the retrofit assembly of FIG. 18 with the change assembly ring ready-to-install.
Figure 21:
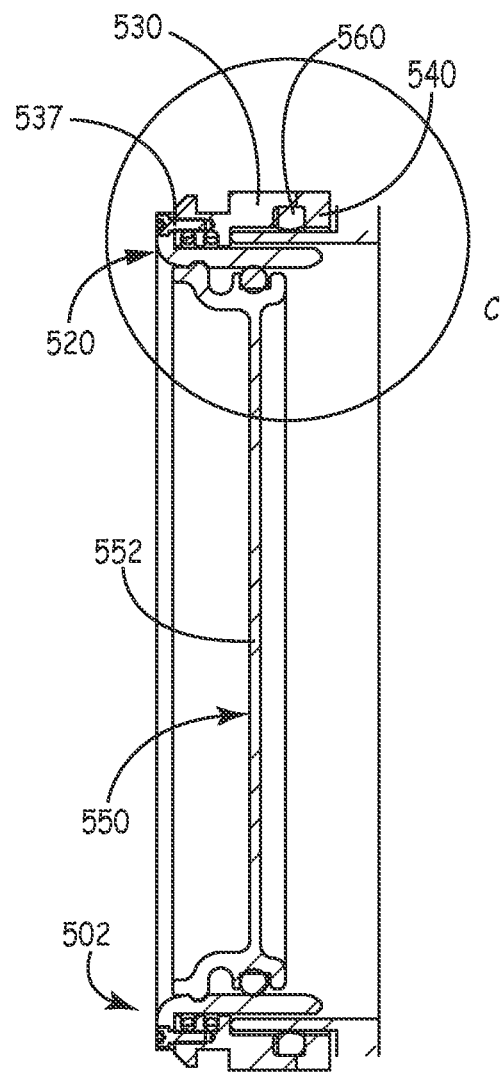
FIG. 21 is a cross-sectional view of the embodiment of the retrofit assembly of FIG. 18 with the change assembly installed.
Figure 22:
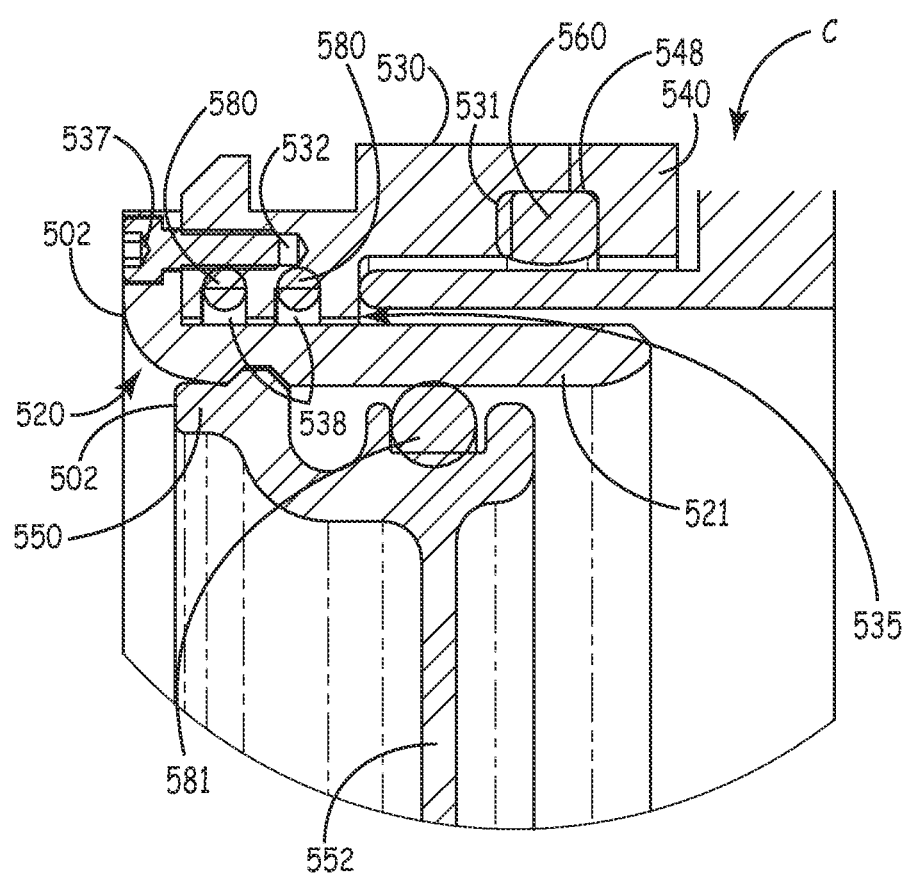
FIG. 22 is an enlarged cross sectional view of portion C from FIG. 21.

Now installing a retrofit assembly consistent with an alternative embodiment of the current technology will be described. FIG. 18 is a perspective view of the alternative embodiment of the retrofit assembly with the inner enclosure ring ready-to-install. FIG. 19 is a cross-sectional view of the alternative embodiment of the retrofit assembly with the inner enclosure ring ready-to-install. FIGS. 20-22 depict the retrofit assembly after the change assembly has been installed. Particularly, FIG. 20 is a perspective view of the embodiment of the retrofit assembly of FIG. 18 after the change assembly has been installed. FIG. 21 is a cross-sectional view of the embodiment depicted in FIG. 20. FIG. 22 is an enlarged view of detail C of FIG. 21.

Starting with FIG. 18 and FIG. 19, a retaining flange 540 is disposed over the annular port ring 100, and set screws 545 are received by corresponding set screw openings 544 defined about the circumference of the retaining flange 540 to engage both the retaining flange 540 and the outer surface of the annular port ring 100. An outer enclosure ring 530 is also disposed over the annular port ring 100 and screws 533 are received by the screw holes 536 of the outer enclosure ring 530 and the clearance holes (not visible in FIG. 18 or FIG. 19) of the retaining flange 540. Two o-rings 580 are disposed within o-ring grooves 538 defined by the outer enclosure ring 530. A compression seal mating surface 531 of the outer enclosure ring 530 and a compression seal opening 548 defined by the retaining flange 540 receive, and exert force on a compression seal 560 that, as such, exerts force on the outside surface of the annular port ring 100.

A change assembly 502 having an inner enclosure ring 520 and an access element 550 is aligned with an inner annular receiving surface 535 of the outer enclosure ring 530. The change assembly 502 is viewable in FIG. 18 for purposes of clarity, but in a variety of embodiments the change assembly 502 would not be visible in such a configuration because it is disposed in an ejection tool similar to that depicted in FIG. 12 and described in the description associated therewith.

Figure 8:
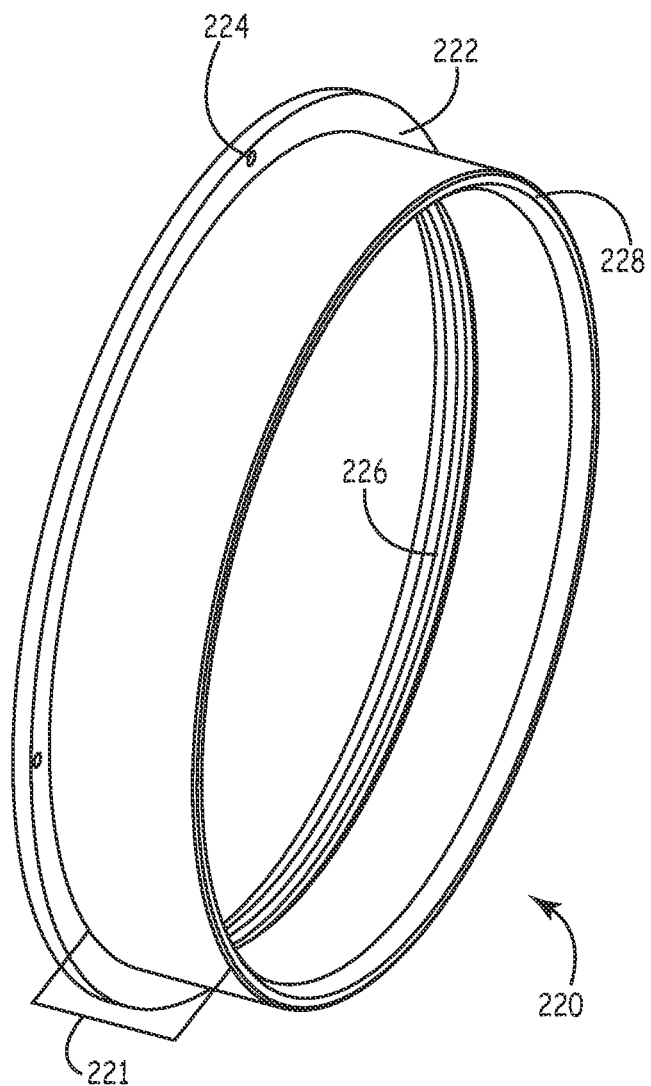
FIG. 8 is a perspective view of an inner enclosure ring.

The inner enclosure ring 520 is similar to that depicted in FIG. 8, and has at least one removable installation tab 523 that prevents progression of the inner enclosure ring 520 through the inner diameter of the outer enclosure ring 530 and the annular port ring 100 until the one or more installation tabs 523 are removed. Such configuration can allow proper positioning of system components before progression of the inner enclosure ring 520 and, therefore, any prior art components that may be present in the annular port ring to prevent contamination of either side of the glove port or system components.

To install the change assembly 502, the installation tabs 523 are removed from the inner enclosure ring 520, and the change assembly 502 is pushed through to overcome frictional forces exerted by the inner annular receiving surface 535 of the outer enclosure ring 530 and the associated o-rings 580 to progress the flange 522 such that it abuts the outer enclosure ring 530. As such, a substantial portion of the first annular cylinder body 521 extends into the opening of the outer enclosure ring 530 and the annular port ring 100. Likewise, the access element 550 also is at least partially disposed in the opening defined by the outer enclosure ring 530 and the annular port ring 100.

Figure 25:
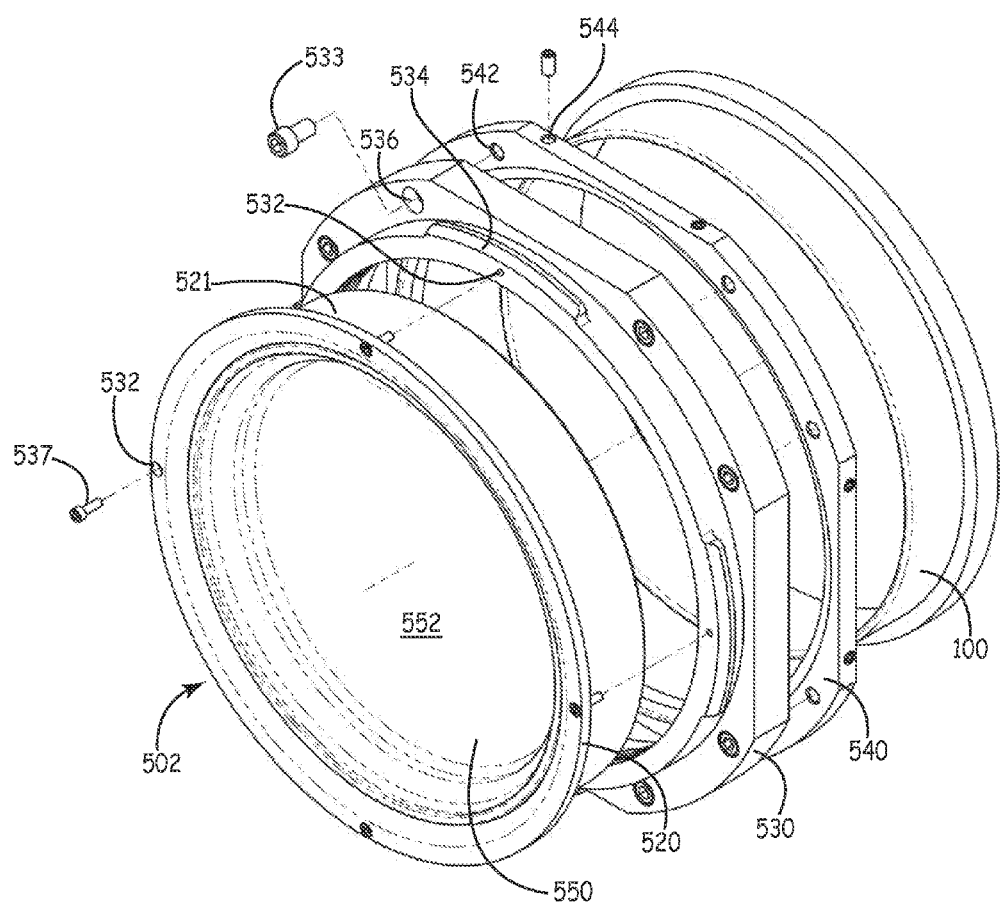
FIG. 25 is an exploded view of the embodiment of a retrofit assembly depicted in FIG. 21.

As mentioned above, FIG. 20 is a perspective view of the embodiment of the retrofit assembly of FIG. 18 with the inner enclosure ring installed, FIG. 21 is a cross-sectional view of the same, and FIG. 22 is a view of detail C from FIG. 21. Fasteners 537 disposed in fastener holes 532 defined by the inner enclosure ring 520 engage the outer enclosure ring 530 through fastener holes 532 defined therein. An o-ring 581 is disposed between the access element 550 and the inner enclosure ring 520 that can help provide a seal. FIG. 25 is an exploded view of the retrofit assembly as depicted in FIGS. 18-22. In one embodiment, a method of manufacturing a system for retrofitting a sealed enclosure includes the step of forming an outer enclosure assembly configured to be clamped to the outer annular face of the port ring. The outer enclosure assembly may be machined from stainless steel or another metal, in one embodiment. The outer enclosure assembly includes a compression seal mating surface, and in another step of the method of manufacture, a compression seal is placed against the compression seal mating surface of the outer enclosure assembly. In another step, the inner ring is formed. The inner ring can also be formed from stainless steel or another metal. In one embodiment, a ring housing is formed which includes an outer ring portion and an inner ring portion. In another step, the retaining flange is formed. In some embodiments, the retaining flange is machined from stainless steel or another metal. In yet another step, the access element is formed, where the access element is configured to be positioned within the first annular cylinder body of the inner ring. Where the access element is a glove ring and glove, the glove ring can be high density polyethylene (HDPE), and can be molded. Alternatively, the glove ring can be stainless steel or another metal in one embodiment, and can be machined. Where the access element is a plug, it can either be molded from HDPE or machined from stainless steel or another metal. Many other methods of forming these components are possible also. Another step in the manufacture process is positioning the o-ring on an outer surface of the access element.

Now alternate embodiments that are not depicted will be described, using FIG. 22 for explanation. In various embodiments it can be desired to replace one or more components with a single component. For example, a ring housing can be incorporated into the system that essentially combines the functionality of the outer enclosure ring and the inner enclosure ring. The portion of the component associated with the functionality of the outer enclosure ring can be referred to as an outer ring portion and the portion of the component associated with the functionality of the inner enclosure ring can be referred to as an inner ring portion. Instead of a screw 537 coupling the inner enclosure ring to the outer enclosure ring as in the embodiment depicted in FIG. 22, the inner enclosure portion and the outer enclosure portion can be separate portions of a single component that is the ring housing.

In such an embodiment the ring housing is configured to form a sealed engagement with an annular face of the port ring, where the annular face can be the inner annular face or the outer annular face of the port ring. In one embodiment, the outer ring portion of the ring housing attaches to a retaining flange in order to squeeze a compression seal between the ring housing and the retaining flange and urge the compression seal against an outer annular face of the port ring, similar to as shown in and explained with reference to FIG. 22.

The ring housing generally extends beyond the outermost end of the port ring. The inner ring portion of the ring housing, like the inner ring depicted in FIG. 22, has an outermost end, an innermost end, and a first annular cylinder body having an outer diameter sized to be slidably received by the port ring. The inner ring portion can, similar to the inner enclosure ring, be interpreted as having a "flange" at the outermost end of the inner ring. Such flange extends outwardly from the first annular cylinder body and couples to the outer ring portion of the ring housing.

In such an embodiment an access element remains as already described herein and is configured to be positioned within the first annular cylinder body. Such access element is slidably removable from, and in sealing engagement with, the first annular cylinder body, similar to the embodiments discussed throughout this application. In such an embodiment the ring housing and the installed access element would be used to slide out any components that are present and install the retrofit system.

In yet another embodiment, the ring housing could be used to replace the functionality of the outer enclosure ring, the inner enclosure ring, and the retaining flange, as well. In such an embodiment the outer enclosure portion of the ring housing would include a portion that replaces the functionality of the retaining flange. In such an embodiment it could be possible to couple the ring housing to the wall surrounding the port ring, for example, or, in another example, simply utilizing set screws to engage the outer annular surface of the port ring, as has been discussed herein.

Figure 23:
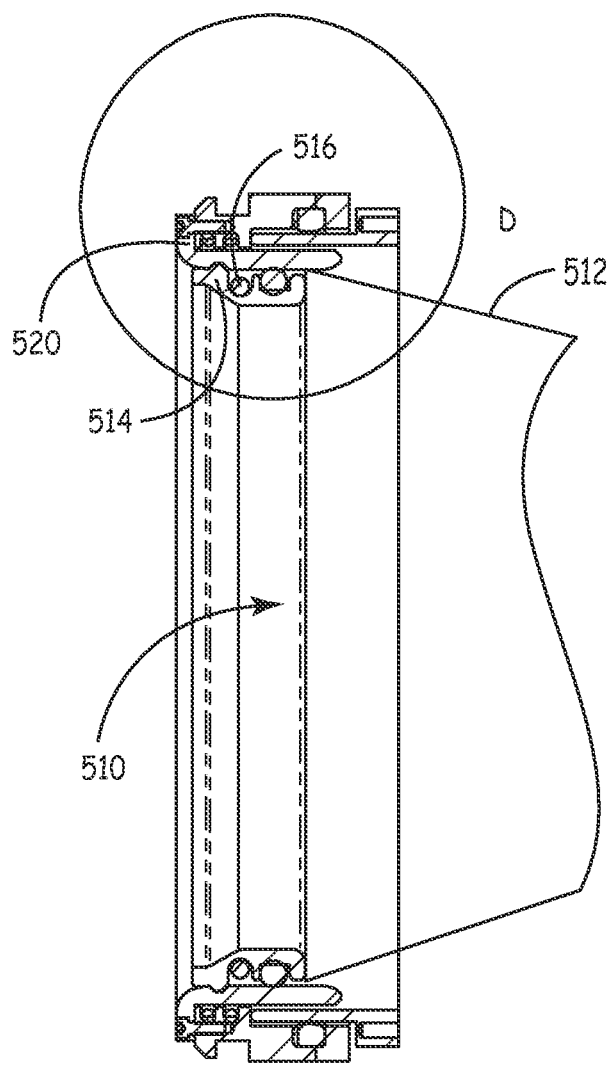
FIG. 23 is a cross-sectional view of the embodiment of the retrofit assembly of FIG. 18 with the change assembly installed, where the change assembly has a different access element that the embodiment depicted in FIG. 21.
Figure 24:
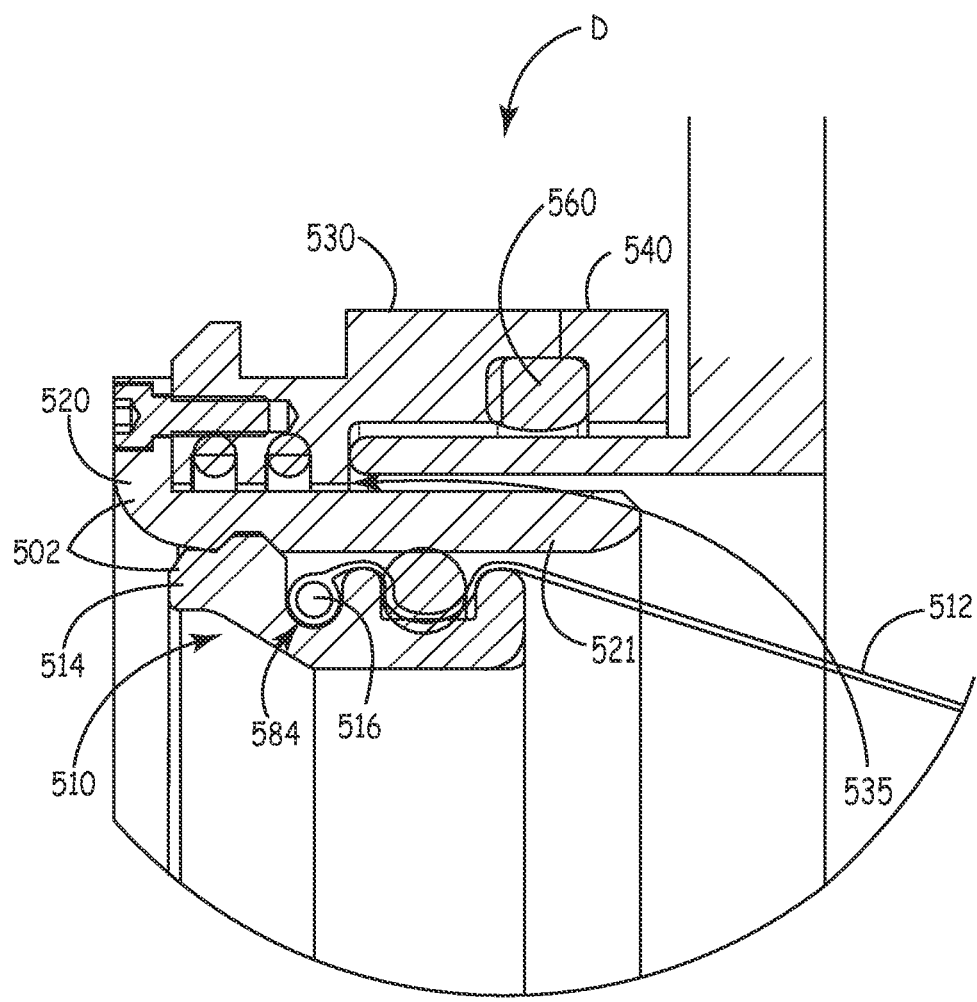
FIG. 24 is an enlarged cross sectional view of portion D from FIG. 23.

In the embodiments discussed above and depicted in FIGS. 18-22 and 25, the access element 550 is a plug. The plug 550 is generally circular and defines a perimeter that is configured to be in mutual engagement with the inner annular surface of the inner enclosure ring. The plug 550 additionally has a blocking element 552 that extends across the entire inner diameter of the inner enclosure ring 520. The access element can also be a glove assembly or a bag assembly. FIG. 23 is a perspective view of an assembled retrofit assembly where the access element is a glove assembly 510. FIG. 24 is an enlarged view of detail D in FIG. 23. The glove assembly 510 has a glove 512 and a glove ring 514, where the glove ring 514 defines an opening by which a user can access the glove 512. The glove ring 514 accommodates a bead 516 on the outermost shoulder end of the glove 512 in a mating groove 584 defined by the glove ring 514.

Figure 20:
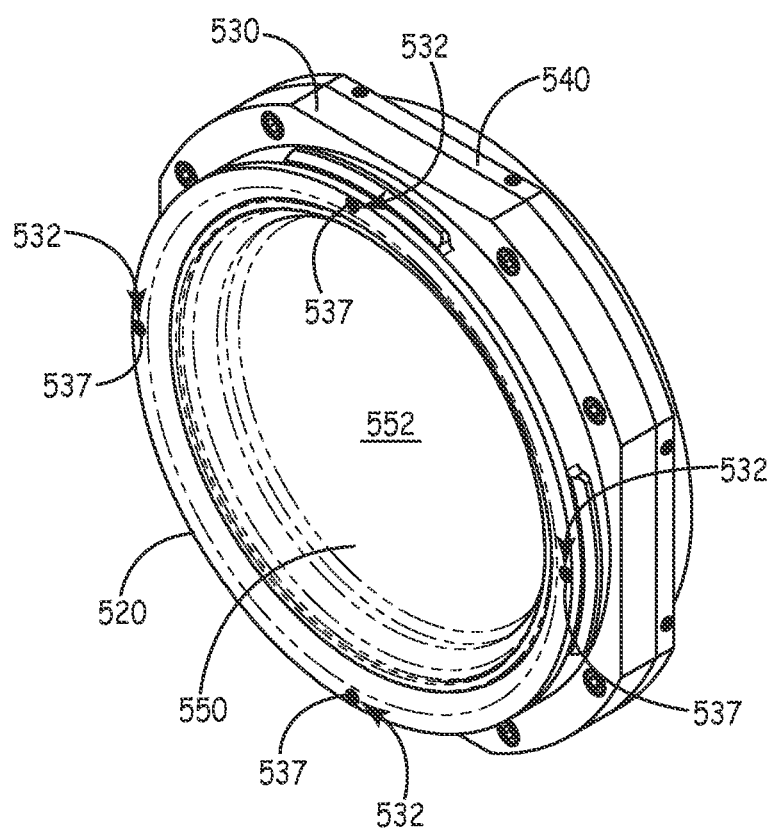
FIG. 20 is a perspective view of the embodiment of the retrofit assembly of FIG. 18 with the change assembly installed.

As mentioned above, FIG. 25 is an exploded view of the embodiment of a retrofit assembly depicted in FIG. 20. A retaining flange 540 is mounted on an annular port ring 100. An outer enclosure ring 530 is mounted on the annular port ring 100 and engages the surface of annular port ring 100. A change assembly 502 having an inner enclosure ring 520 and an access element, which is a plug 550, is received by an inner receiving surface of the outer enclosure ring 530 and the inner diameter of the annular port ring 100. A substantial portion of a first annular cylinder body 521 of the inner enclosure ring 520 extends through the inner annular receiving surface 535 of the outer enclosure ring 530 and the annular port ring 100. The interaction of receiving surfaces and inner surfaces of components of the retrofit assembly can be viewed with more clarity in FIG. 22 or FIG. 24, for example.

In various embodiments, the inner annular receiving surface 535 is adjacent to the opening of the annular port ring 100 and has a length that is less than about half of the length of the inner annular port ring. In at least one embodiment, the inner annular receiving surface 535 is adjacent to the opening of the annular port ring 100 and has a length that is less than about 30% of the length of the inner annular port ring.

In some embodiments, the first annular cylinder body 521 extends through at least half of the length of the annular port ring 100, where the length of the annular port ring 100 is discussed above in the description associated with FIG. 1. In some embodiments, over half of the length of the first annular cylinder body 521 extends into the annular port ring 100. In various embodiments, the total length of the opening defined by the inner enclosure ring 520 and the annular port ring 100 is no greater than 200% of the total length of the opening defined by the inner enclosure ring 520, itself. In particular embodiments, the total length of the opening defined by the inner enclosure ring 520 and annular port ring 100 ranges from about 6.4 centimeters to no more than about 8.6 centimeters.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A system for retrofitting a sealed enclosure for performing work therein in order to provide improved exchange of access elements, wherein the sealed enclosure includes an annular port ring having an inner annular face and an outer annular face and being fixedly secured in leak-proof sealed relation in a port in the wall of said enclosure, the inner annular face and the outer annular face of the port ring both extending between a first outermost end and a second innermost end where the second innermost end is in contact with the wall of said enclosure, the system comprising:
 A) an outer enclosure assembly configured to form a sealed engagement with an annular face of the port ring entirely outside of the sealed enclosure, wherein the outer enclosure assembly is a separate component from the port ring;
 B) a change assembly having an outermost end and an innermost end, comprising:
  i) an inner ring having an outermost end and an innermost end, the inner ring comprising a first annular cylinder body having an outer diameter sized to be slidably received by the port ring, the inner ring further comprising a flange at the outermost end of the inner ring, the flange extending outwardly from the first annular cylinder body, wherein the inner ring is configured to form a seal with the outer enclosure assembly, and
  ii) an access element configured to be positioned within the first annular cylinder body and in sealing engagement with the first annular cylinder body, wherein the access element is slidably removable from the first annular cylinder body;
 whereby the change assembly is configured to eject a port component into the enclosure when the change assembly is inserted into the annular port ring.

2. The system of claim 1 wherein the access element comprises:
 A) a glove having an outermost shoulder end and innermost hand end;
 B) a glove support ring having an outer diameter sized to be received by the shoulder end of the glove and configured to be slidably received by the first annular cylinder body and to trap the shoulder end of the glove between the glove support ring and the first annular cylinder body, where the glove support ring will be in sealing engagement with the first annular cylinder body.

3. The system of claim 1 wherein the access element comprises a removable circular plug configured to be positioned within the first annular cylinder body and in sealing engagement with the first annular cylinder body.

4. The system of claim 3 further comprising:
 A) a glove having an outermost shoulder end and innermost hand end;
 B) a glove support ring having an outer diameter sized to be received by the shoulder end of the glove and to be slidably received by the first annular cylinder body and to trap the shoulder end of the glove between the glove support ring and the first annular cylinder body, wherein the glove support ring will be in sealing engagement with the first annular cylinder body;
 wherein the circular plug is pushed into the sealed enclosure when the glove support ring is inserted into the first annular cylinder body.

5. The system of claim 4 wherein the glove support ring comprises a protruding shoulder structure on an outer surface of the glove support ring, and wherein the inner ring has an inner annular surface that defines a groove for receiving the shoulder structure.

6. The system of claim 1 wherein the access element is a bag sealing ring and a bag.

7. The system of claim 1 wherein the access element comprises an outer surface comprising a protruding shoulder structure and the inner ring comprises a groove for receiving the shoulder structure.

8. The system of claim 7 wherein the access element outer surface further comprises at least one o-ring to form the sealing engagement with the first annular cylinder body of the inner ring.

9. The system of claim 1 wherein the outer enclosure assembly defines an inner annular receiving surface having at least one o-ring, wherein the inner annular receiving surface extends beyond the first outermost end of the port ring.

10. The system of claim 9, wherein the inner annular receiving surface is adjacent to the opening of the annular port ring and has a length that is less than about 30% of the length of the annular port ring.

11. The system of claim 1, wherein the first annular cylinder body extends through at least half of the length of the annular port ring.

12. The system of claim 1, wherein at least half of the length of the first annular cylinder body extends into the annular port ring.

13. The system of claim 1, wherein the total length of the opening defined by the inner ring and the annular port ring is no greater than 200% of the total length of the opening defined by the inner ring.

14. The system of claim 13, wherein the total length of the opening defined by the inner ring and annular port ring ranges from about 6.4 centimeters to no more than about 8.6 centimeters.

15. The system of claim 1, wherein the outer enclosure assembly comprises an outer enclosure ring and a retaining flange, where the outer enclosure ring and the retaining flange are configured to mutually engage.

16. The system of claim 15, further comprising:
a compression seal between the outer enclosure ring and the retaining flange; wherein the outer enclosure ring is mounted on the first outermost end of the annular port ring; and the retaining flange is mated with the outer annular face of the annular port ring and has an inner diameter greater than an inner diameter of a portion of the outer enclosure ring.

17. The system of claim 16, wherein the retaining flange defines a plurality of screw holes, the outer enclosure ring defines a plurality of screw holes, and the screw holes on the outer enclosure ring are aligned with the screw holes on the retaining flange.

18. The system of claim 16, further comprising a plurality of set screws around the outside of the retaining flange.

19. The system of claim 1, wherein the outer enclosure assembly is configured to be clamped to the outer annular face of the port ring and the sealed engagement is with the outer annular face of the port ring.

20. The system of claim 1, wherein the outer enclosure assembly defines an inner annular receiving surface that is positioned at the outermost end of the port ring, wherein the first annular cylinder body is configured to be received in sealing engagement with the inner annular receiving surface.

21. The system of claim 20, wherein the flange outer diameter is larger than the inner diameter of the inner annular receiving surface.

22. A method for retrofitting an annular port ring in a sealed enclosure for performing work therein in order to provide improved exchange of access elements for use with the sealed enclosure, wherein the sealed enclosure comprises an annular port ring having an inner annular face and an outer annular face and being fixedly secured in leak-proof sealed relation in a port in the wall of said enclosure, the inner annular face and the outer annular face of the port ring both extending between a first outermost end and a second innermost end where the second innermost end is in contact with the wall of said enclosure, the method comprising:
A) installing an outer enclosure assembly surrounding the port ring entirely outside of the enclosure and forming a sealed engagement with an outer annular surface of the port ring, wherein the outer enclosure assembly comprises an inner annular receiving surface that is positioned at the outermost end of the port ring and is adjacent to an inner annular face of the port ring, wherein the outer enclosure assembly is a separate component from the port ring;
B) providing a change assembly having an outermost end and an innermost end, the change assembly comprising:
i) an inner ring comprising a first annular cylinder body having an outer diameter sized to be slidably received by the port ring, wherein the inner ring has an innermost end and outermost end, and where the first annular cylinder body is received in sealing engagement with the inner annular face of the annular port ring, the inner ring further comprising a flange extending outwardly from the first annular cylinder body, wherein the flange is at the outermost end of the inner ring; and
ii) an access element positioned within the first annular cylinder body and in sealing engagement with the first annular cylinder body, wherein the access element is slidably removable from the first annular cylinder;
C) inserting the innermost end of the change assembly into the outer enclosure assembly forming a sealing engagement between the change assembly and the inner annular receiving surface of the outer enclosure assembly;
D) further inserting the change assembly into the outer enclosure assembly until the flange contacts the outer enclosure assembly, wherein the chance assembly and the outer enclosure assembly are in direct contact.

23. The method of claim 22 wherein the access element comprises a removable circular plug positioned within the first annular cylinder body and in sealing engagement with the first annular cylinder body and further comprising the steps of:
providing an elongated impermeable flexible glove having an outermost shoulder end and innermost hand end;
providing a glove support ring having an outer diameter sized to be received by the shoulder end of the glove and slidably received by the first annular cylinder body and to trap the shoulder end of the glove between the glove support ring and the first annular cylinder body, where the glove support ring will be in sealing engagement with the first annular cylinder body; and
inserting the glove support ring and glove into the first annular cylinder body.

24. The method of claim 23 wherein a mechanical ejector assembly is used to insert the glove support ring and glove into the first annular cylinder body.

25. The method of claim 23 wherein the removable circular plug is ejected when the glove support ring is inserted.

26. The method of claim 22, wherein the step of installing the outer enclosure assembly further comprises:

mounting a retaining flange to the outer annular face of the port ring;

mounting an outer enclosure ring to the first outermost end of the port ring;

disposing screws through clearance holes on the retaining flange and the outer enclosure ring; and compressing a seal between the retaining flange and the outer enclosure ring.

27. A system for retrofitting a sealed enclosure for performing work therein in order to provide improved exchange of access elements, wherein the sealed enclosure includes an annular port ring having an inner annular face and an outer annular face and being fixedly secured in leak-proof sealed relation in a port in the wall of said enclosure, the inner annular face and the outer annular face of the port ring both extending between a first outermost end and a second innermost end where the second innermost end is in contact with the wall of said enclosure, the system comprising:

A) an outer enclosure assembly configured to form a sealed engagement with an annular face of the port ring;

B) a change assembly having an outermost end and an innermost end, comprising:

i) an inner ring having an outermost end and an innermost end, the inner ring comprising a first annular cylinder body having an outer diameter sized to be slidably received by the port ring, the inner ring further comprising a flange at the outermost end of the inner ring, the flange extending outwardly from the first annular cylinder body, wherein the inner ring is configured to be in direct contact with the outer enclosure assembly and form a seal with the outer enclosure assembly, and ii) an access element configured to be positioned within the first annular cylinder body and in sealing engagement with the first annular cylinder body, wherein the access element is slidably removable from the first annular cylinder body;

whereby the change assembly is configured to eject a port component into the enclosure when the change assembly is inserted into the annular port ring.

28. The system of claim 27 wherein the outer enclosure assembly defines an inner annular receiving surface having at least one o-ring, wherein the inner annular receiving surface extends beyond the first outermost end of the port ring.

29. The system of claim 27, wherein the outer enclosure assembly comprises an outer enclosure ring and a retaining flange, where the outer enclosure ring and the retaining flange are configured to mutually engage.

30. The system of claim 27, wherein the outer enclosure assembly is configured to be clamped to the outer annular face of the port ring and the sealed engagement is with the outer annular face of the port ring.

31. The system of claim 27, wherein the outer enclosure assembly defines an inner annular receiving surface that is positioned at the outermost end of the port ring, wherein the first annular cylinder body is configured to be received in sealing engagement with the inner annular receiving surface.

* * * * *